(12) United States Patent
Helbert et al.

(10) Patent No.: US 12,717,148 B2
(45) Date of Patent: Aug. 25, 2026

(54) MODULAR COMPONENTS FOR WEARABLE ELECTRONIC DEVICES

(71) Applicant: Apple Inc., Cupertino, CA (US)

(72) Inventors: Kendall L. Helbert, San Francisco, CA (US); Heidi Williamson, San Francisco, CA (US); James W. Vandyke, Sydney (AU); Neal D. Evans, Sunnyvale, CA (US); Nikolas T. Vitt, Redwood City, CA (US); Samuel G. Smith, San Francisco, CA (US); Nicolas Lylyk, Sunnyvale, CA (US); Richard P. Howarth, San Francisco, CA (US); Trevor J. Ness, Santa Cruz, CA (US); Darshan R. Kasar, San Francisco, CA (US); Muhammad F. Hossain, Sunnyvale, CA (US); Christopher S. Graham, San Francisco, CA (US); Daniel C. Wagman, Scotts Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/292,851

(22) PCT Filed: Jul. 27, 2022

(86) PCT No.: PCT/US2022/074210

§ 371 (c)(1),
(2) Date: Jan. 26, 2024

(87) PCT Pub. No.: WO2023/010052

PCT Pub. Date: Feb. 2, 2023

(65) Prior Publication Data

US 2024/0369847 A1 Nov. 7, 2024

Related U.S. Application Data

(60) Provisional application No. 63/203,707, filed on Jul. 28, 2021, provisional application No. 63/203,710,
(Continued)

(51) Int. Cl.
*G06F 1/16* (2006.01)
*G02B 27/01* (2006.01)

(52) U.S. Cl.
CPC ......... *G02B 27/0176* (2013.01); *G06F 1/163* (2013.01); *G06F 1/1635* (2013.01);
(Continued)

(58) Field of Classification Search
CPC ........ G02B 27/0176; G02B 2027/0152; G02B 2027/0156; G02B 2027/0169;
(Continued)

(56) References Cited

U.S. PATENT DOCUMENTS 3,944,344 A * 3/1976 Wichers .................. G02C 5/16 351/110
6,715,218 B2 * 4/2004 Johnson ............ A41D 13/0531 36/89

(Continued)

FOREIGN PATENT DOCUMENTS

| | | | |
|---|---|---|---|
| KR | 200478490 | Y1 | 10/2015 |
| KR | 20200014752 | A | 2/2020 |
| WO | 2018093917 | A1 | 5/2018 |

OTHER PUBLICATIONS

PCT International Search and Written Opinion for International Application No. PCT/US2022/074210, mailed Nov. 17, 2022 (22 pp.).

*Primary Examiner* — Jose R Soto Lopez
(74) *Attorney, Agent, or Firm* — Dorsey & Whitney LLP

(57) ABSTRACT

A component for a wearable electronic device can include a housing defining an internal volume, a first connector that is
(Continued)

removably attachable to a head-mounted display, the first connector configured to electrically connect to the head-mounted display, and a second connector that is removably attachable to a supplemental unit, the second connector configured to electrically connect to the supplemental unit. The component can include a stiffener disposed in the internal volume, and the stiffener can be flexible along a first axis and rigid along two axes that are perpendicular to the first axis and to each other. An operational component can be disposed in the internal volume, and the operational component can be electrically connected to at least one of the first connector or the second connector.

32 Claims, 15 Drawing Sheets

Related U.S. Application Data filed on Jul. 28, 2021, provisional application No. 63/203,705, filed on Jul. 28, 2021.

(52) U.S. Cl.
CPC ................ *G02B 2027/0152* (2013.01); *G02B 2027/0156* (2013.01); *G02B 2027/0169* (2013.01); *G06F 1/1688* (2013.01); *G06F 1/1698* (2013.01)

(58) Field of Classification Search
CPC ...... G06F 1/163; G06F 1/1635; G06F 1/1688; G06F 1/1698; H01M 10/0436; H04R 1/10
See application file for complete search history.

(56) References Cited

U.S. PATENT DOCUMENTS 6,927,344 B1 * 8/2005 Gall .................... H05K 1/0278 174/254
7,562,658 B2 * 7/2009 Madaus ........... A61M 16/0633 2/418
9,001,005 B2 4/2015 Abdollahi et al.
9,038,870 B2 5/2015 Johnson
9,066,787 B1 * 6/2015 Price .................... A61F 5/0106
9,436,009 B1 * 9/2016 Bhardwaj ............ G06F 1/1656
9,612,623 B2 * 4/2017 Lim ................... H04M 1/0269
9,974,915 B2 * 5/2018 Haskard ........... A61M 16/0666
10,133,358 B1 * 11/2018 Chen ....................... G06F 3/012
10,156,727 B2 12/2018 Miller et al.
10,212,517 B1 * 2/2019 Beltran ............. G02B 27/0101
10,502,363 B2 12/2019 Edwards et al.
11,716,036 B1 * 8/2023 Shverdin ................ G06F 1/183 310/317
11,816,886 B1 * 11/2023 Newcombe ........... G06V 20/20
2003/0197678 A1 * 10/2003 Siddeeq ................. G06F 1/163 345/156
2004/0034724 A1 * 2/2004 Bruner ................ G11B 27/105 360/69
2004/0112377 A1 * 6/2004 Amarasinghe .... A61M 16/0666 128/207.11
2006/0202959 A1 * 9/2006 Chang ................ G06F 3/03543 345/163
2007/0030442 A1 * 2/2007 Howell ................. G02C 5/143 351/158
2007/0064542 A1 * 3/2007 Fukushima ........... G04G 21/00 368/282
2007/0279852 A1 * 12/2007 Daniel .................. H04B 1/385 361/728
2009/0073330 A1 3/2009 Viala
2010/0053546 A1 * 3/2010 Lanaro .................... G02C 5/16 351/114
2012/0075169 A1 * 3/2012 Iba .................... G02B 27/0149 345/8
2012/0167879 A1 * 7/2012 Bowman .......... A61M 16/0655 128/205.12
2012/0287396 A1 * 11/2012 Fuchs ..................... G02C 5/16 351/113
2013/0049675 A1 * 2/2013 Minami ................. G06F 1/266 320/103
2013/0220327 A1 * 8/2013 Barlow ............ A61M 16/0816 128/205.25
2013/0250503 A1 * 9/2013 Olsson .................... G02C 5/12 361/679.03
2013/0318776 A1 * 12/2013 Jacobs ................ G02B 27/017 29/592.1
2013/0321925 A1 * 12/2013 Jacobs .............. G02B 27/0176 29/428
2013/0322683 A1 * 12/2013 Jacobs .............. G02B 27/0149 382/103
2013/0329182 A1 * 12/2013 Wilson .................. G02C 5/146 351/153
2014/0102456 A1 * 4/2014 Ovizinsky ........ A61M 16/0066 128/205.25
2014/0132911 A1 * 5/2014 Yoshida ................ G02C 5/143 29/20
2014/0157593 A1 * 6/2014 Lin ......................... H05K 3/30 29/832
2014/0218269 A1 * 8/2014 Cazalet ............... G02B 6/0229 345/8
2014/0240103 A1 * 8/2014 Lake ...................... G06F 1/163 340/12.5
2014/0375947 A1 * 12/2014 Park .................. G02B 27/0176 351/178
2015/0220172 A1 * 8/2015 Garcia .................. H05K 5/026 345/156
2015/0223355 A1 * 8/2015 Fleck ..................... G06F 1/163 361/679.03
2015/0323808 A1 * 11/2015 Chen ....................... G02C 5/00 351/103
2016/0094079 A1 * 3/2016 Hiroki ...................... H02J 7/34 320/108
2016/0116766 A1 * 4/2016 Hsuan ................... H04N 7/183 348/376
2016/0342176 A1 * 11/2016 Han ...................... G04G 21/00
2017/0013338 A1 * 1/2017 Wong ...................... G06F 3/017
2017/0235148 A1 * 8/2017 Kamakura ......... G02B 27/0176 359/630
2017/0248991 A1 * 8/2017 Fauci .................... G02C 11/04
2017/0270778 A1 * 9/2017 Melton, Jr. ........ G08B 21/0286
2017/0289666 A1 * 10/2017 Pejaudier .............. H04R 1/105
2017/0329288 A1 * 11/2017 Cho ...................... G04B 37/12
2017/0339260 A1 * 11/2017 Haymond ........... H04M 1/0262
2017/0346319 A1 * 11/2017 Wang ...................... H02J 7/731
2017/0348500 A1 * 12/2017 Johnson ........... A61M 16/0688
2018/0008016 A1 * 1/2018 Tahmasebzadeh .... G06F 1/1643
2018/0017742 A1 * 1/2018 Louderback ......... G02B 6/4246
2018/0074550 A1 * 3/2018 Sorias .................. G06F 1/1632
2018/0203505 A1 * 7/2018 Trail ....................... G06F 1/163
2018/0210491 A1 * 7/2018 Song ..................... G04G 17/04
2018/0333292 A1 * 11/2018 Blaszczykiewicz ...... A61F 5/56
2019/0101866 A1 * 4/2019 Georgiou ........... G02B 27/0172
2019/0137948 A1 * 5/2019 Yaghmour ........... G06F 1/1632
2020/0174259 A1 6/2020 Steger
2020/0201042 A1 6/2020 Wang et al.
2020/0343775 A1 * 10/2020 Yahagi ............... G02B 27/0176
2020/0355926 A1 * 11/2020 Williams ........... G02B 27/0176
2020/0403352 A1 * 12/2020 Jen ........................... G06T 3/08
2021/0008312 A1 * 1/2021 Young ................. A61M 16/021
2021/0349322 A1 * 11/2021 Harris ................ G02B 27/0176
2021/0391620 A1 * 12/2021 Porter ................. G02B 27/017
2022/0096774 A1 * 3/2022 Barlow ............ A61M 16/0683
2022/0210922 A1 * 6/2022 Uhm ...................... H05K 1/028
2022/0346232 A1 * 10/2022 Jun ..................... H04M 1/0277
2022/0347562 A1 * 11/2022 Mason .................. A63F 13/211
2023/0152594 A1 * 5/2023 Davidson .......... G02B 27/0176 359/601
2023/0157552 A1 * 5/2023 Thuering ............ A61B 5/0205 600/301
2023/0185098 A1 * 6/2023 Wang ................ G02B 27/0176 345/8

(56) References Cited

U.S. PATENT DOCUMENTS

| | | | | |
|---|---|---|---|---|
| 2023/0308613 | A1* | 9/2023 | Okuhara | G06T 5/80 |
| 2023/0326067 | A1* | 10/2023 | Suzuki | G06T 7/194<br>382/103 |
| 2023/0344927 | A1* | 10/2023 | Hoellwarth | G02B 27/017 |
| 2023/0359266 | A1* | 11/2023 | Howell | G06F 3/011 |
| 2024/0108840 | A1* | 4/2024 | Barlow | A61M 16/06 |
| 2024/0111163 | A1* | 4/2024 | Law | A61M 21/00 |
| 2024/0385648 | A1* | 11/2024 | Singamsetty | G06F 1/163 |

* cited by examiner 231
233
237
235
235

230
236
239
238
232

230
257
256
253
254
251
252
250
232

330
336
339
338
332

430
436
439
438
432

530
536
538
533
539
532

530
556
558
553
557
552
551
532

C
532
530
539
534'
534
538
536

630
636
638
639
633
632

630
656
658
657
653
651
650
652
632

632
630
639
634
634
638
636

730
736
733
739
738
732

730
756
757
759
758
751
732

732
730
739
734
734
738
736

830
836
838
833
839
835
832

830
856
858
857
851
859
832

832
830
839
834
834
835
838
836

930
936
933
939
938
932

930
956
957
959
958
950
951
932

932
930
939
934
934
938
936

1030
1036
1033
1038
1032

1030
1056
1057
1059
1058
1051
1050
1032

1032
1030
1039
1034
1034
1038
1036

MODULAR COMPONENTS FOR WEARABLE ELECTRONIC DEVICES

CROSS-REFERENCE TO RELATED APPLICATIONS

This claims priority to U.S. Provisional Patent Application No. 63/203,705, filed 28 Jul. 2021, and entitled "MODULAR COMPONENTS FOR WEARABLE ELECTRONIC DEVICES," U.S. Provisional Patent Application No. 63/203,707, filed 28 Jul. 2021, and entitled "MODULAR COMPONENTS FOR WEARABLE ELECTRONIC DEVICES," and U.S. Provisional Patent Application No. 63/203,710, filed 28 Jul. 2021, and entitled "MODULAR COMPONENTS FOR WEARABLE ELECTRONIC DEVICES," the disclosures of which are hereby incorporated by reference in their entireties.

FIELD

The described embodiments relate generally to wearable electronic devices. More particularly, the present embodiments relate to modular wearable electronic devices and associated components.

BACKGROUND

Wearable electronic devices, including head mounted displays, can have a variety of different uses, from entertainment to industrial applications. Additionally, wearable electronic devices can provide users with multimedia experiences that include both visual and audio content. Additionally, a user may desire different levels of comfort, securement, weight reduction, or other features in various different use and/or media scenarios. Existing wearable devices, however, typically have a single form factor that must be relied upon for various different media and use scenarios. The single form factor of these devices often results in a compromise between these various features that may not be ideal for any single use scenario.

Accordingly, there exists a need for wearable devices having a modular form factor that can allow for components to be selected to be included in the device depending on the particular desired use scenarios for the device.

SUMMARY

According to some aspects, a component for a wearable electronic device can include a housing defining an internal volume the housing being flexible along a first axis and rigid along a second axis and a third axis, the second axis and the third axis being perpendicular to the first axis and to each other, a first connector that is removably couplable to a head-mounted display, the first connector configured to electrically connect to the head-mounted display, a second connector that is removably couplable to a supplemental unit, the second connector configured to electrically connect to the supplemental unit, and an operational element disposed in the internal volume, the operational element electrically connected to at least one of the first connector or the second connector.

In some examples, the operational element can include a speaker. The operational element can include a touch sensor. The operational element can include a data output component. The component can include a polymer stiffener having a stiffness higher than a stiffness of the housing. The component can include a metal stiffener. The component can further include a third connector that is removably couplable to a retention band. A connection between the component and the retention band can be rotationally fixed.

According to some aspects, a wearable electronic device can include a head-mounted display (HMD), a supplemental unit, a retention band, and a strap. The strap can include a flexible housing and an HMD connector to provide electrical communication between the strap and the HMD. The HMD connector can be positioned at a first end of the flexible housing. The strap can further include a supplemental unit connector to provide electrical communication between the strap and the supplemental unit, the supplemental unit connector can be positioned at a second end of the flexible housing opposite the first end. The strap can further include a retention band connector that is removably connectable to the retention band, the retention band connector positioned at an external surface of the flexible housing.

In some examples, the strap is a first strap that includes an operational component disposed in an internal volume defined by the housing, and the wearable electronic device further includes a second strap that is removably connectable to the HMD and the retention band. The first strap and the second strap can be joined by a third strap that can extend over a user's head when the wearable electronic device is worn by a user. The retention band connector can be positioned at the second end of the flexible housing. The retention band can define a pocket configured to retain the supplemental unit. The retention band can include a battery in electrical communication with the strap. The strap can have a length greater than a width or a height thereof. The supplemental unit can be a first processing unit, and the retention band can include a second processing unit in communication with the strap.

According to some aspects, a component for a wearable electronic device can include a printed circuit board including electronic components, a retention band connector that is configured to provide a mechanical connection between the component and a retention band such that the retention band is rotationally fixed to the component, a display connector that is configured to provide data and power to the display, and a housing that is flexible in a first direction and rigid in at least one direction that is perpendicular to the first direction. The housing can include a material overmolded around at least a portion of the printed circuit board.

In some examples, the component can further include a stiffener disposed in the housing and positioned adjacent to the supplemental unit connector. The retention band connector can include a first connection portion and a second connection portion spaced apart from the first connection portion on a same side of the component.

According to some aspects, an audio component for a wearable electronic device can include a housing at least partially defining an internal volume and an audio port, a display connector to releasably connect to a display and provide electrical communication to the display, a first audio module disposed in the internal volume and configured to output a first range of audio frequencies, and a second audio module disposed in the internal volume and configured to output a second range of audio frequencies different than the first range, a driver of the first audio module and a driver of the second audio module can be in communication with the audio port.

In some examples, the housing defines a back port, and the driver of the first audio module is in communication with the back port. The first audio module and the second audio module can include closed-box speakers. A thickness of a first portion of the housing containing the first audio module and the second audio module can be greater than a thickness of a second portion of the housing. The housing can define two opposing major surfaces and the audio port can be positioned at a minor surface joining the two opposing major surfaces. At least one of the major surfaces can extend an entire length of the internal volume. The housing can define a major surface and an offset surface proud of the major surface, and the audio component can include a supplemental unit connector to releasably and electrically connect to a supplemental unit, the supplemental unit connector can be positioned at the offset surface.

According to some aspects, a wearable electronic device can include a head-mounted display (HMD), a supplemental unit, and a strap. The strap can include an HMD connector to releasably connect the strap to the HMD and provide electrical communication therebetween, a supplemental unit connector to releasably connect the strap to the supplemental unit and provide electrical communication therebetween, an audio module, a housing defining an audio port configured to direct sound to a user's ear, and a retention band connectable to the strap.

In some examples, the strap can be a first strap and the wearable electronic device can include a second strap, the second strap including an HMD connector to releasably connect the strap to the HMD and an audio module. The housing can define an internal volume having a first portion and a second portion that is wider than the first portion, and the audio module can be disposed in the second portion. The audio module can be at least one of a woofer or a tweeter. The strap can include a sensor to detect a location of a user's ear.

According to some aspects, an audio component for a wearable electronic device can include a housing at least partially defining an internal volume and an audio port, a display connector that is removably connectable to a display to provide electrical communication between the audio component and the display, a retention band connector that is removably connectable to a retention band, an audio module disposed in the internal volume, the audio module including a driver, and a flexible acoustic guide defining a channel in communication with the driver and the audio port.

In some examples, the housing defines a back port spaced apart from the audio port, and the driver is in communication with the back port. The audio module can be a close-box audio speaker. The flexible acoustic guide can be flexible along a first bend direction and rigid along a second, different bend direction. The flexible acoustic guide can define multiple channels. The channels can each have a round cross-sectional area. The audio module can be a first audio module, and the audio component can further include a second audio module configured to output a sound having a different range of frequencies than sound output by the first audio module. The second audio module can be positioned adjacent to the audio port and in communication with the audio port.

According to some examples, a component for a wearable electronic device can include a housing, an HMD connector to provide electrical communication between the component and the HMD, the HMD connector positioned at a first end of the housing, a supplemental unit connector to provide electrical communication between the component and the supplemental unit, the supplemental unit connector positioned at a second end of the housing opposite the first end, and a conductor in electrical communication with the HMD connector and the supplemental unit connector, the conductor disposed in the housing.

In some examples, the component can further include a retention band connector to provide a mechanical connection to a retention band. The retention band connector can be configured to provide electrical communication between the component and the retention band. The retention band connector can be positioned on an opposite side of the housing from the supplemental unit connector. The HMD connector can be positioned at an edge of the housing and the supplemental unit connector can be positioned at a major surface of the housing. The conductor can extend along a center-line of the housing. The conductor can be a first conductor, and the component can further include a second conductor in electrical communication with the HMD connector and the supplemental unit connector. The first conductor can be disposed adjacent to an internal surface of the housing and the second conductor can be disposed adjacent to a second, different internal surface of the housing. The HMD connector can define at least a portion of two major surfaces of the component.

According to some aspects, a wearable electronic device can include a head-mounted display (HMD), a supplemental unit, a flexible strap that is removably connectable to the HMD and the supplemental unit, the strap including an HMD connector to exchange power and data with the HMD, a supplemental unit connector to exchange power and data with the supplemental unit, and a transmission component in electrical communication with the HMD connector and the supplemental unit connector to provide power and data therebetween.

In some examples, the flexible strap is a first flexible strap, and the wearable electronic device includes a second flexible strap. The second flexible strap can receive power and/or data from the supplemental unit through an electrical connection to the HMD. The supplemental unit connector can include a mechanical connector and an electrical connector. The supplemental unit can include a strap connector configured to connect to the supplemental unit connector, and the strap connector can be configured to rotate relative to the supplemental unit connector when connected. The wearable electronic device can further include a retention band configured to mechanically and electrically communicate with the supplemental unit through the flexible strap.

According to some aspects, a component for a wearable electronic device can include a flexible housing, a first connector removably connectable to a first electronic component to electrically connect thereto, a second connector removably couplable to a second electronic component to electrically connect thereto, a stiffener disposed in the flexible housing, the stiffener being flexible in a first direction and rigid in at least one direction that is perpendicular to the first direction, a transmission array disposed in the flexible housing and in electrical communication with the first connector and the second connector to provide power and data therebetween, the transmission array including a first portion adjacent to a first side of the stiffener, and a second portion adjacent to a second side of the stiffener opposite the first side.

In some examples, the first connector can include a printed circuit board disposed in the flexible housing. The component can further include a support member positioned between the printed circuit board and the stiffener, the support member being more rigid than the stiffener in the first direction. The first connector can be configured to electrically and mechanically connect to the first electronic component. The first electronic component can be rotatable relative to the first connector when connected.

According to some aspects, a system includes a head mounted display (HMD), the HMD including a housing, a display attached to the housing, and an electrical input positioned on the housing and electrically connected to the display. The system can also include a flexible strap moldable to a head, and an intermediate member removably connectable to the HMD and the flexible strap.

In some examples, the system can include an electrical connector on the intermediate member corresponding to the electrical input. The system can also include wires passing through the intermediate member to the electrical connector. The system can also include a battery input on the intermediate member opposite the electrical connector, the battery input can be connected to the wires. In some examples, power is conveyed through the intermediate member to the HMD.

In some examples of the system, the intermediate member is mechanically connected to the flexible strap, and the intermediate member is mechanically and electrically connected to the HMD. The intermediate member of the system can include a body, and a processor can be positioned in body. In some examples, a speaker can be positioned in the body. The body can further define a port acoustically connected to the speaker.

In some examples of the system, the intermediate member can be a first intermediate member, and the system further includes a second intermediate member removably connectable to the HMD and the flexible strap. When the first intermediate member is connected to the HMD and the flexible strap, the second intermediate member is connected to the HMD and the flexible strap, and the system is worn by a user, the first intermediate member and the second intermediate member each extend from a temple area of the user to an ear area of the user. In some examples of the system, the intermediate member includes a flexible strap connector, an HMD connector, and a power connector.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
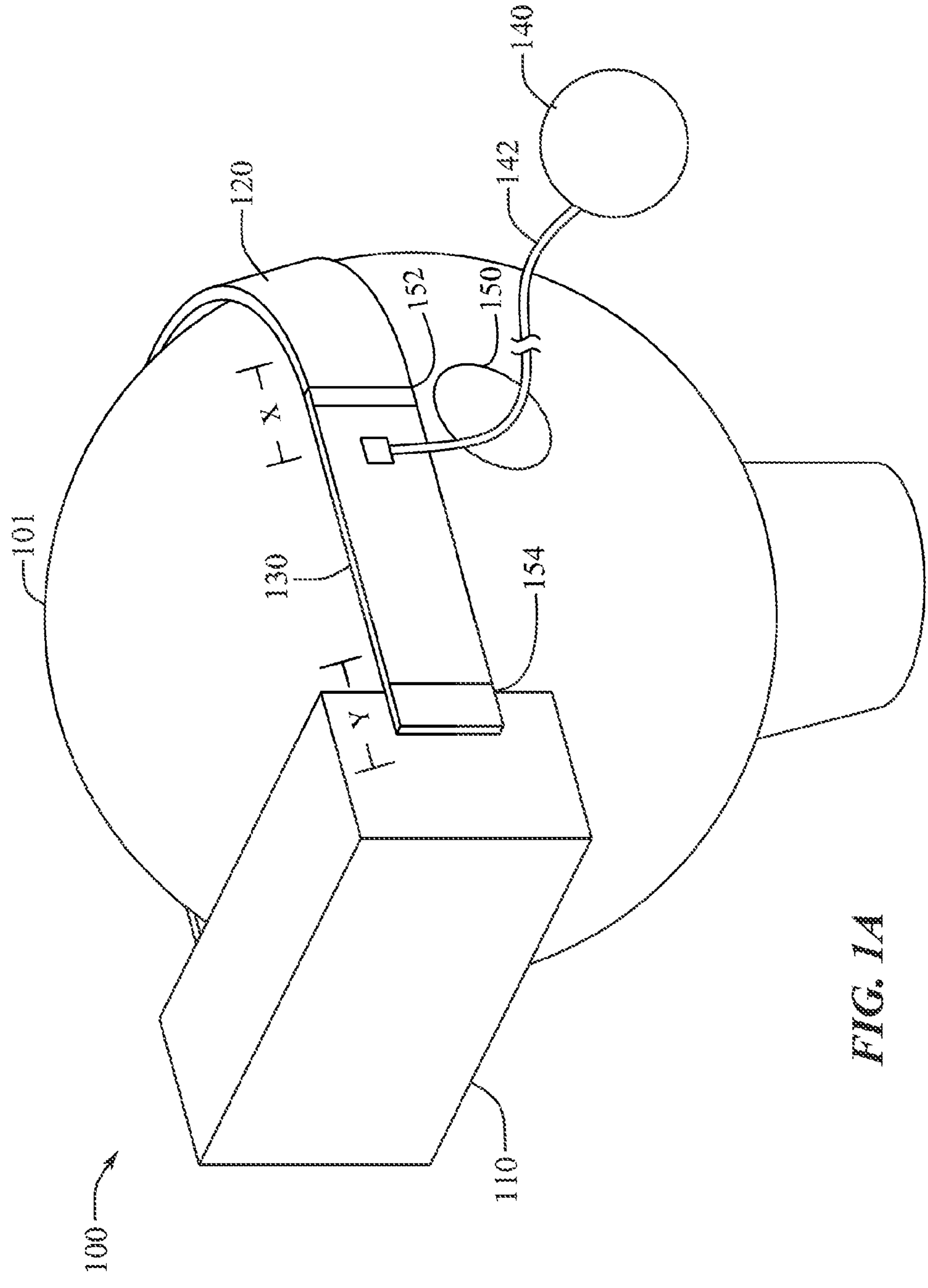
FIG. 1A shows a wearable electronic device being worn by a user.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

As virtual reality (VR) and mixed reality (MR) become more ubiquitous, the demand for user friendly head-mounted displays with quality components increases. Traditionally, these VR/MR systems have been devices that include a wearable display component, often referred to as a head-mounted display (HMD) and a supplemental unit. The supplemental unit can be part of the HMD, or can be a separate component that is permanently connected to the HMD through a cable, wires, or other conductors. The supplemental unit can provide power and/or added processing functionality to the system. The components of these systems are not interchangeable and thus only have a single configuration. VR/MR systems are increasingly being used in a variety of different environments and scenarios. Thus, it can be desirable for a VR/MR system to have different properties depending on the desired use or uses.

For example, certain components can maximize comfort levels and audio quality, while other components can reduce the weight of the wearable and maximize securement of the device. The modular nature of a wearable VR/MR system and its associated components can allow particular components to be selected for incorporation into the device. For example, the components that maximize comfort and audio quality can be selected for scenarios where a user may wear a device for long periods of time, while the components that maximize weight reduction and securement may be selected for scenarios where a user desired to be highly mobile.

Further, traditional VR/MR systems, including HMD systems and devices, have packaged most or all of the components of the device in a housing that is worn on the user's face. Even in systems that contain a separate processing unit, almost all of the electronic components of the HMD portion are packaged in a single housing that is mounted to the user's head. In addition to reducing the customizability of the HMD device, this type of design can concentrate the devices weight in a single location, potentially reducing comfort for the user. In contrast, the HMD devices and systems described herein can include multiple modular and connectable parts that can distribute the electronic and functional components of the device in more than one location, increasing both modularity and comfort for a user.

These and other embodiments are discussed below with reference to FIGS. 1-13. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A shows a wearable electronic device 100 being worn on the head 101 of a user. The wearable electronic device 100 can include a number of modular components. For example, the wearable device 100 can include a head-mounted display (HMD) 110 including a housing 105 and a display 107 attached to the housing for displaying images to a user (shown in FIG. 1B), one or more intermediate members, flexible straps, or connector straps 130, a retention band 120 that can be a flexible band or a band that is moldable to a user's head, and an optional supplemental unit 140 such as an external power supply, memory component, and/or processor. Although referred to as a wearable electronic device 100, it should be understood that the device 100 can include multiple modular components or devices and can be interchangeably referred to as a wearable electronic device, wearable electronic device system, and/or wearable electronic system. Additionally, although the particular component 110 can be referred to as an HMD, it should be understood that the terms HMD, HMD device, and/or HMD system can be used to refer to the wearable device 100 as a whole.

In some examples, and as shown, the device 100 can be worn on the user's head 101 such that the HMD 110 is worn on the user's face and disposed over one or both of their eyes. The HMD can be removably and/or releasably connected to the connector strap or straps 130 as described further herein. In some examples, the connector straps 130 can be positioned against the side of a user's head 101 and in contact therewith. In some examples, the connector straps 130 can be positioned above the user's ear 150 or ears, as shown. In some examples, the connector straps 130 can be positioned adjacent to the user's ear or ears. The connector straps 130 can be removably connected to the retention band 120, which can extend around the user's head 101 and removably connect to the other of the connector straps 130 (not shown). In this way, the HMD, connector straps 130, and retention band 120 can form a loop that can retain the wearable electronic device 100 on the user's head 101. As shown in FIG. 1A, the connector straps 130 can connect to the HMD 110, both mechanically and electrically, at an HMD connection location 154 that can include an electrical input or electrical connector that is attached to the housing 105 and electrically connected to the display 107 (FIG. 2). This location can be identified as a temple area "Y" that can be defined as an area near a user's temple adjacent to the user's eye, and can span from in front of the user's eye to approximately 1-1.5 inches past the outer corner of a user's eye, along the side of the user's head. Similarly, the connector straps 130 can connect to the retention band 120 at a retention band connection location 152 identified as an ear area "X" that can span to include the area above the user's ear 150 or within 0.5 inches of the outer edge of the ear on either side. In this manner, the connector straps 130 are able to provide structural support between the HMD 110 and the user's ear 150, while securely connecting the retention band 120 and translating the retention forces of the retention band through the wearable electronic device 100. It should be understood, however, that this configuration is just one example of how the components of a modular wearable electronic device 100 can be arranged, and that in some, a different number of connector straps and/or retention bands can be included.

Figure 1B:
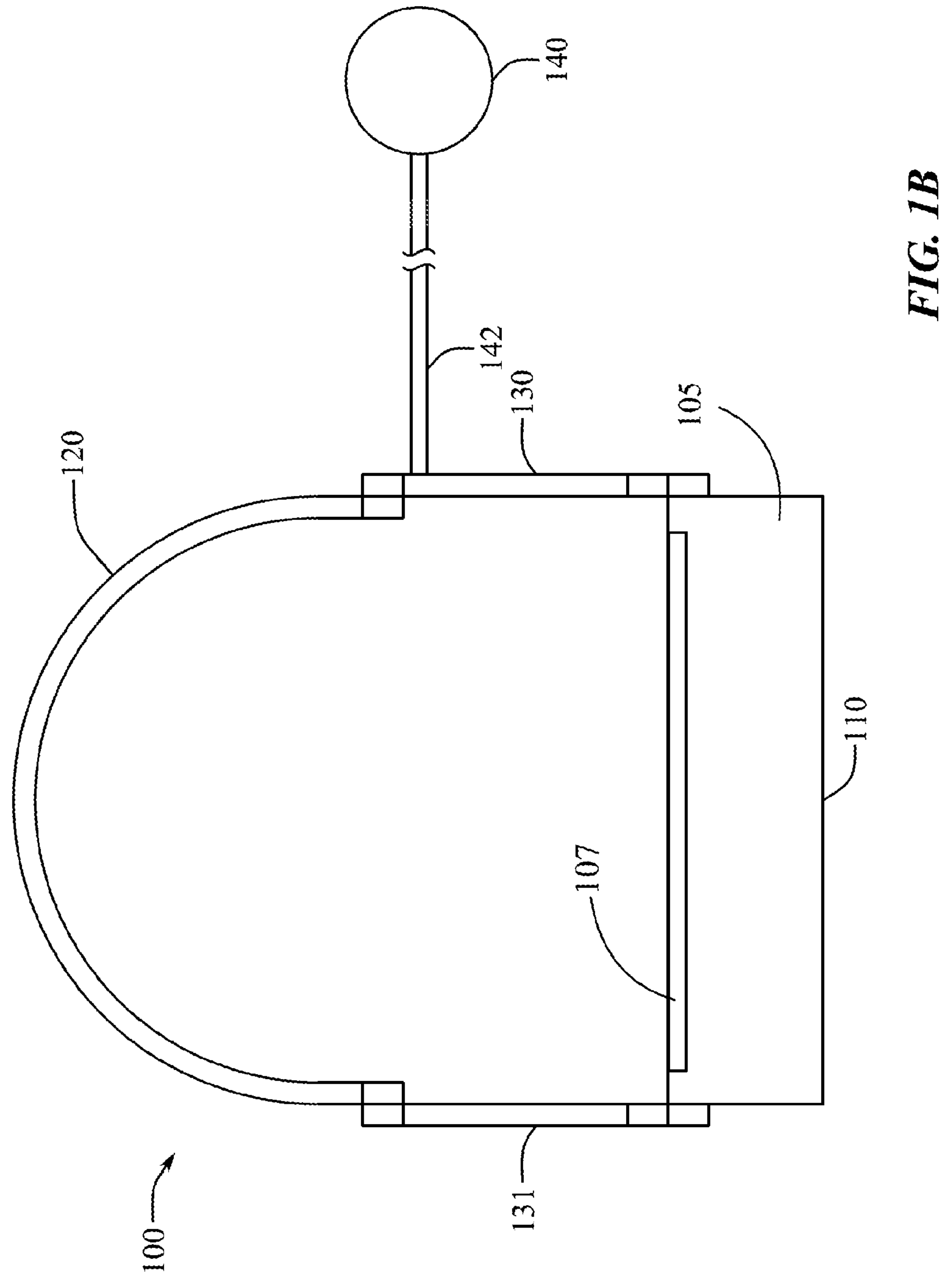
FIG. 1B shows a top view of the wearable electronic device of FIG. 1A.

FIG. 1B shows a top view of the wearable electronic device 100, demonstrating how the components of the device 100 can be mechanically and/or electrically connected to one another in some examples. In the example shown in FIG. 1B, a first connector strap 130 and a second connector strap 131 can each be removably connected or coupled to either side of the HMD 110. In some examples, the connector straps 130, 131 can both be electrically and mechanically coupled or connected to the HMD and can operate as an intermediate member located between the HMD and the retention band 120. In some examples, one of the connector straps 130, 131 can be mechanically connected, but may not be electrically connected to the HMD. The connector straps 130, 131 can each be connected to the retention band 120 at a different location on the connector strap 130, 131 than the connection to the HMD. For example, the HMD can be connected to a first end of each connector strap 130, 131, and the retention band 120 can be connected to a second, opposite end of each connector strap 130, 131.

In some examples, and as shown, at least one of the connector straps 130 can also be connected to a supplemental unit 140. The supplemental unit 140 can contain one or more processors, batteries or power supplies, antennas, and any other electrical and/or processing components, as desired. In some examples, power and/or data from the supplemental unit can be provided to the HMD through the connector strap 130 via a connection between the supplemental unit 140 and the connector strap 130, as described herein. In the present example, a conductor or cable 142 can electrically connect the supplemental unit 140 to the connector strap 130, through which the supplemental unit can provide power and/or communicate with the HMD 110, second connector strap 131, and/or retention band 120.

Although the supplemental unit 140 is shown as being connected to the connector strap 130 through a wired connection 142, it should be understood that in some examples the supplemental unit 140 may wirelessly connect or communicate data and/or power with the connector strap 130 and/or HMD 110 by any desired method or technology. Additionally, in some examples, the supplemental unit 140 can be incorporated into, or can be an integral part of, one or more of the other components of the device 100, including the retention band 120, the connector straps 130, 131, and/or the HMD. Further, although the components of the wearable electronic device 100 are shown as being connected to one another at certain locations, it should be understood that any of the components of the device 100 can be electrically and/or mechanically connected to one or more of any of the other components of the device 100, in any manner and location, as desired.

Figure 1C:
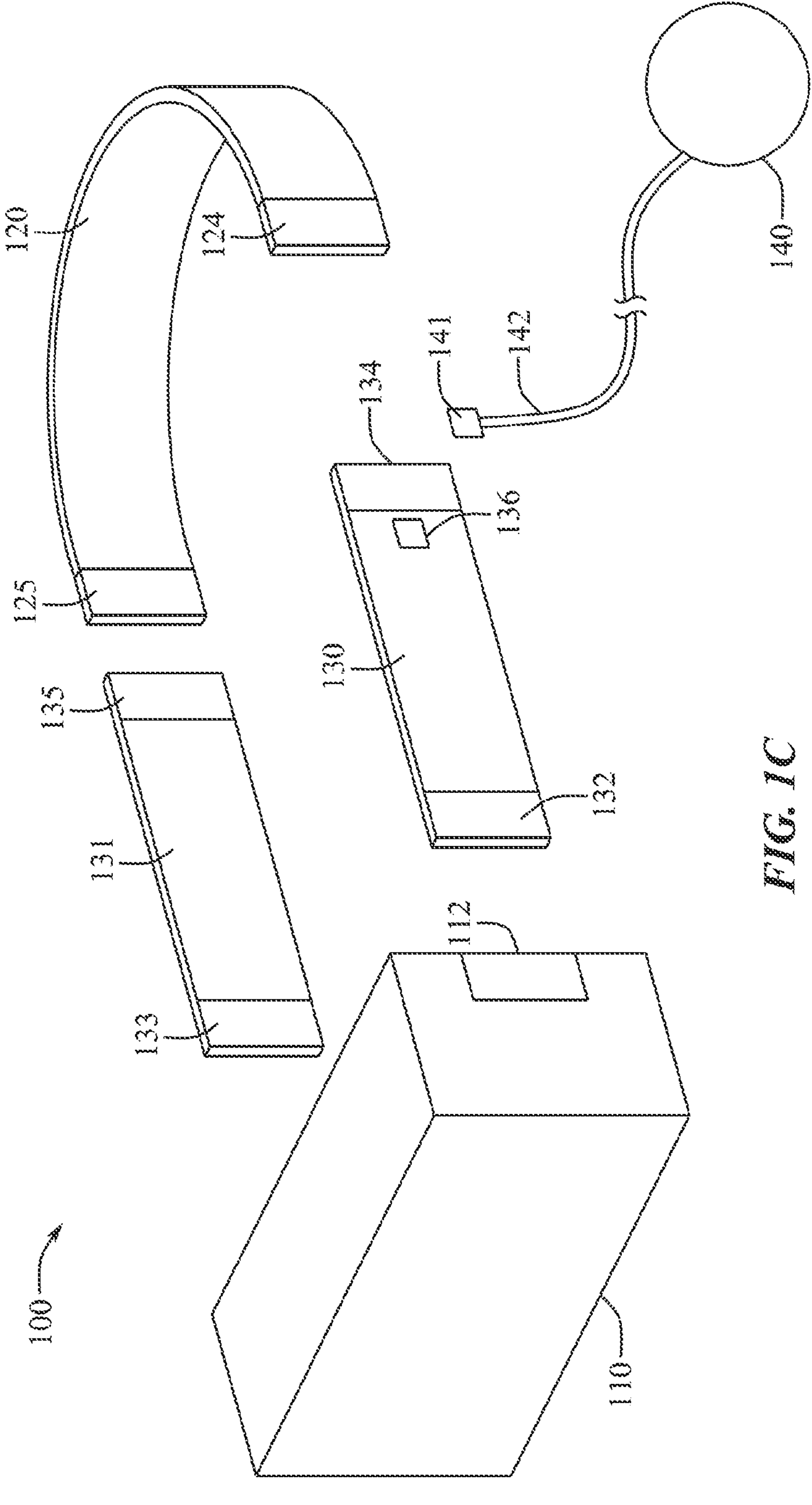
FIG. 1C shows an exploded view of the wearable electronic device of FIG. 1A.

FIG. 1C shows an exploded view of the wearable electronic device 100, including the locations of connectors on the various components, as described herein. As can be seen, the connector strap 130 can include a first connector 132, also referred to as an HMD connector, to provide electrical communication between the connector strap 130 and the HMD 110 by removably or releasably attaching to a corresponding connector 112 on the HMD 110. As used herein, providing electrical communication between two elements can include providing any type of electrical signal including power and/or data. Additionally, in some examples, an intermediate component can include conductive elements that are in electrical communication with two or more components and can transmit an electrical signal from one component to another. In other words, multiple components can be in electrical communication with one another, including components that conduct electrical signals, and not just components that are transmitting or receiving the electrical signals. The first connector 132 can be positioned at a first end of the connector strap 130, and/or the flexible housing thereof. The connector strap 130 can also include a second connector 134 positioned at a second end, such as an opposite end, of the connector strap 130. The second connector 134 can be referred to as a retention band connector or a flexible band connector, and can be removably connectable to the retention band 120 by attaching to a corresponding connector 124 on the retention band 120. The second connector 134 can at least partially define an external surface of the connector strap 130.

The connector strap 130 can further include a third connector 136, also referred to as a supplemental unit connector, that can provide electrical communication between the connector strap 130 and the supplemental unit 140, such as through a corresponding connector 141 that can be coupled to the conductor 142. In some examples, the supplemental unit connector 136 can be positioned at or near an end of the flexible housing of the connector strap 130, opposite the first end. In some examples, the connector 136 can include a mechanical connector surrounding an electrical connector, and the connector 141 can be configured to rotate relative to the supplemental unit connector 136 when connected thereto to facilitate placement and relative freedom for the positioning of the supplemental unit 140.

Similar to the connector strap 130, the second connector strap 131 can include a first connector 133, also referred to as an HMD connector or a display connector, and a second connector 135, also referred to as a retention band connector. These connectors 133, 135 can be positioned at or near opposite ends of the housing of the connector strap 131. The connectors 133, 135, can have substantially the same or similar functionalities as any of the connectors 132, 134, 136. In some examples, the connector 133 can be releasably attached to a corresponding connector of the HMD (not shown), and the connector 135 can be releasably attached to a corresponding connector 125 of the retention band 120.

Any number or variety of components in any of the configurations described herein can be included in a wearable electronic device, such as the HMD devices and/or HMD systems described herein. The components can include any combination of the features described herein, and can be arranged in any of the various configurations described herein. The structure and arrangement of components of a device, as well as the concepts regarding their use can apply not only to the specific examples discussed herein, but to any number of embodiments in any combination. Various examples of electronic devices and electronic device components including some having various features in various arrangements are described below, with reference to FIGS. 2A-4.

Figure 2A:
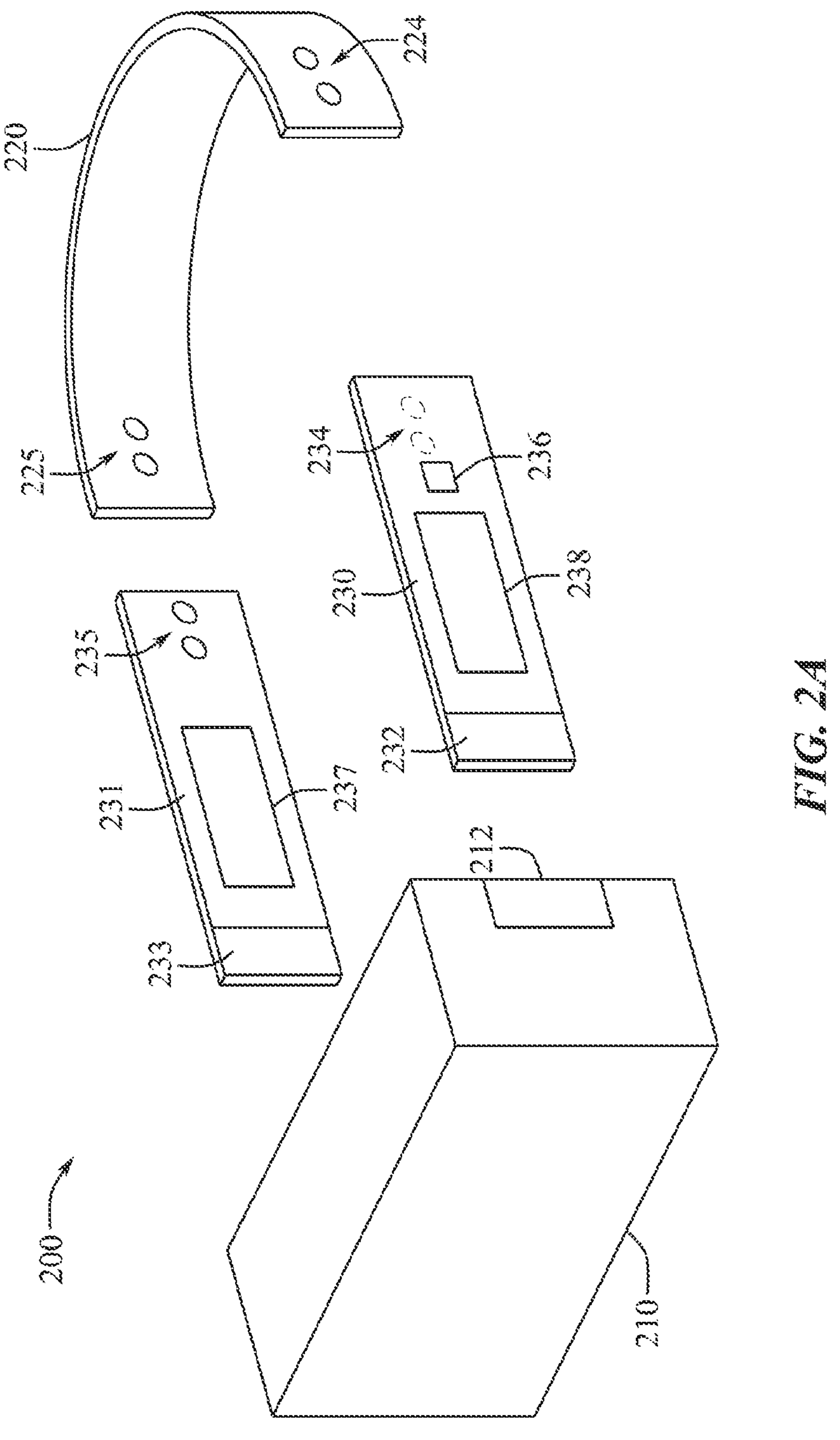
FIG. 2A shows an exploded view of a wearable electronic device.

FIG. 2A shows an exploded view of a wearable electronic device 200 that can include modular components which can be selectively and removably or releasably attached or coupled to one another as described herein. In some examples, the device 200 can be substantially similar to, or can include some or all of the features of the other wearable electronic devices described herein. As with the electronic device 100, the device 200 can include an HMD 210, a retention band 220, and one or more connector straps 230, 231. The device 200 can also include a supplemental unit (not shown) that can be connected to one or more of the components of the device 200 to provide additional functionality, power, processing speed, and the like.

Similar to the connector strap 130, the connector strap 230 can include an HMD connector 232 that can releasably couple to a corresponding connector 212, a retention band connector 234 that can releasably couple to a corresponding connector 224, and a supplemental unit connector 236 that can releasably couple to a supplemental unit. In some examples, the supplemental unit connector 236 includes a battery input and/or a data input, and can alternatively be referred to as a power connector and/or a data connector. In some examples, the HMD connector 232 can be positioned at an edge of the connector strap 230, while the retention band connector 234 and/or the supplemental unit connector 236 can be positioned at a major surface(s) of the connector strap 230, such as a side surface(s).

In some examples, and as shown, the retention band connector 234 and its associated connector 224 on the retention band 220, can include multiple connection points. In some examples, these multiple connection points can be aligned in a single line and can thus rotationally fix the connector strap 230 and the retention band 220 to one another. In some examples, any other type of connection can be implemented that can provide rotational fixation between the connector strap 230 and the retention band 220. In some examples, where the device 200 includes a second connector strap 231, that connector strap 231 can also include an HMD connector 233 and a retention band connector 235 that can be releasably coupled to a corresponding connector 225 so as to be rotationally fixed thereto.

In some examples, and as described further herein, one or more of the connector straps 230, 231 can include one or more operational elements or components 237, 238 disposed at least partially in an internal volume defined by the housing of the connector strap 230, 231. The operational element, component, or components 237, 238 can include any number of functional and/or electrical components, including output components, such as an audio module or component, display module, or data output component, input components, such as a touch sensor or touch sensitive element or component, button, toggle, switch, fingerprint sensor, camera, or other form of sensor, or any other functional and/or operational component desired. Further details of the connector straps 230, 231 are described below with respect to FIGS. 2B-2D.

Figures 2B, 2C, 2D:
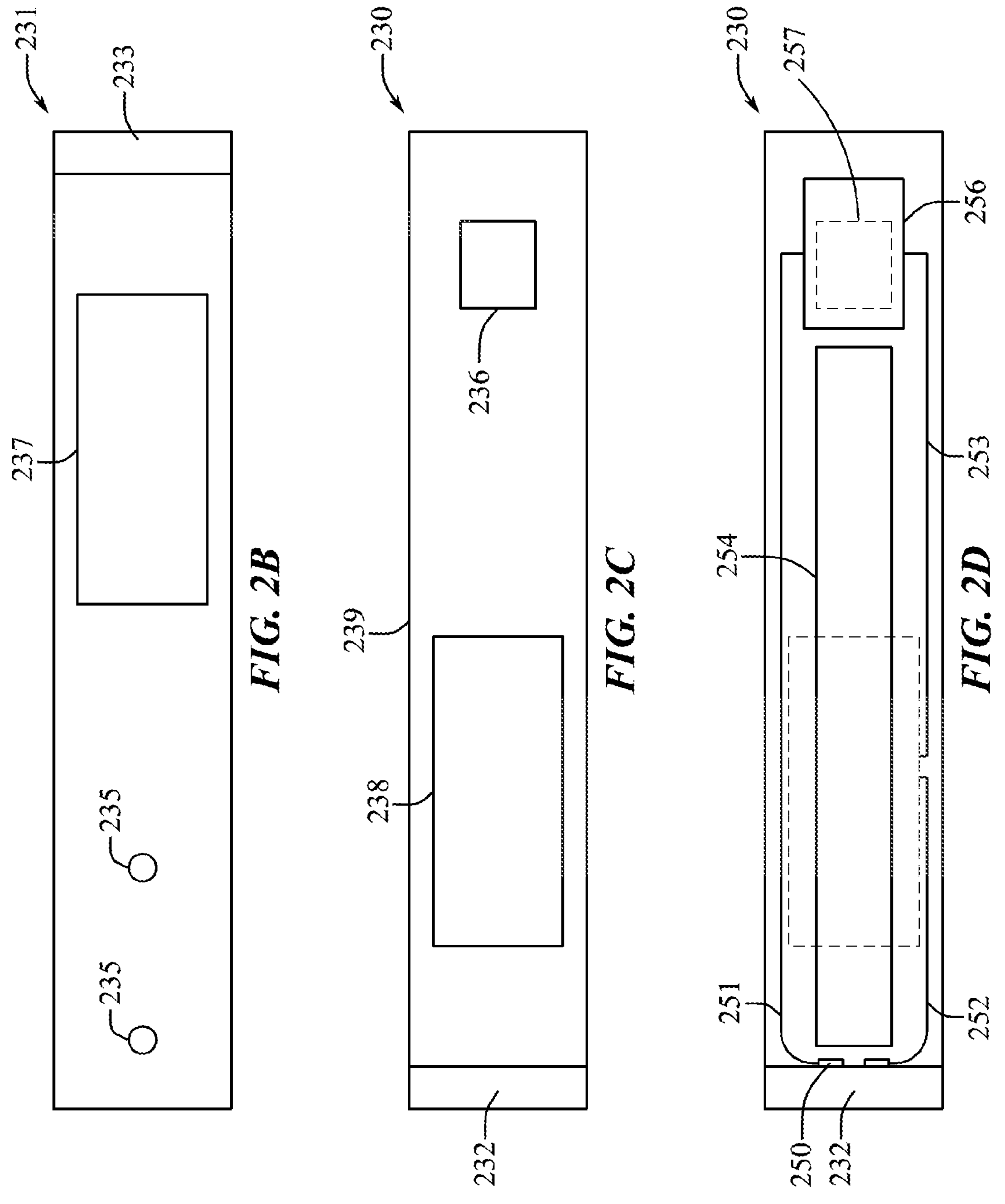
FIG. 2B shows a side view of a component of the wearable electronic device of FIG. 2A.
FIG. 2C shows a side view of a component of the wearable electronic device of FIG. 2A.
FIG. 2D shows a cross-sectional view of the component of FIG. 2C.

FIG. 2B shows a side view of a connector strap 231 of the electronic device 200 shown in FIG. 2A, including an HMD connector 233 disposed at an end of the strap 231, and a retention band connector 235 including multiple connection locations disposed at an opposite end of the strap 231. As can be seen, an operational component 237 can be disposed at least partially in the internal volume of the strap 231 and between the HMD connector 233 and the retention band connector 235. In some examples, and as described further herein, the housing of the strap 231 can be raised or offset at the location of the operational component 237, as desired. In some examples, the operational component 237 itself can at least partially define an exterior surface of the strap 231. Additionally, and as described with respect to FIG. 2D, the operational component 237 can be electrically connected to at least one of the first connector 233 or the second connector 235.

FIG. 2C shows a side view of the other connector strap 230 of the wearable electronic device 200. Whereas the connector strap 231 of FIG. 2B included an HMD connector 233 and a retention strap connector 235, but may not have included a supplemental unit connector, the connector strap 230 of FIG. 2C includes an HMD connector 232, a retention band connector (not shown), and a supplemental unit connector 236. As with the connector strap 231, the strap 230 can include an operational component 238 that can be disposed between the HMD connector 232 and the supplemental unit connector 236, and at least partially within an internal volume defined by the housing 239 of the strap 230.

FIG. 2D shows a cross-sectional or partial cut-away view of the connector strap 230 shown in FIGS. 2A and 2C. In this view, a portion of the housing 239, as well as the operational component 238, are not shown in order to illustrate the internal volume of the strap 230. As can be seen, in some examples, the HMD connector 232 can be electrically connected to the supplemental unit connector 236. In this particular example, a transmission array or transmission component(s) 251, 253, such as wires or other conductive elements, can be disposed in the internal volume to electrically connect the HMD connector 232 and the supplemental unit connector 236, such as to provide data and/or power therebetween. In some examples, the transmission array can include multiple conductors, cables, wires, or other transmission lines 251, 253 for transmitting data and/or power between the HMD connector 232 and the supplemental unit connector 236. In some examples, the lines 251, 253 can be in communication to the connectors through connection points 250, as shown. Additionally, in some examples, the supplemental unit connector 236 can include a printed circuit board 256 that can be at least partially disposed in the internal volume. In some examples, the connector strap 230 can include a processor or a processing unit 257. The conductors 251, 253 of the transmission array can be coupled to one or more locations on this printed circuit board 256, and/or can be directly connected to the supplemental unit connector 236.

In some examples, the housing 239 of the strap 230 can include a relatively flexible material, such as polymeric material, fabric, and/or any desired flexible material or materials. In some examples, the strap 230 can further include a stiffening component or a stiffener 254 disposed at least partially in the internal volume defined by the housing 239. In some examples, the stiffener 254 can be positioned at any desired location or locations in the internal volume, and can extend along any portion of the length of the strap 230. In some examples, the stiffener 254 can be disposed adjacent to the internal components associated with one or both of the HMD connector 232, the supplemental unit connector 236, and/or the retention band connector (not shown).

In some examples, such as where the housing 239 of the strap 230 is relatively flexible, the stiffener 254 can serve to provide structural support to the strap 230 in one or more directions. For example, the stiffener 254 can be flexible along a first axis, and rigid along at least one axis that is perpendicular to the first axis. In some examples, the stiffener 254 can be flexible along a first axis and can be rigid along two axes that are perpendicular to the first axis and to each other. That is, the stiffener 254 can be flexible along a first bend direction, such as a direction extending into and out of the page of FIG. 2D, while being rigid in one or more other bend directions, such as one or more directions parallel to the plane of the page of FIG. 2D. In some examples, the stiffener 254 can include a polymer material, metallic material, and/or combinations thereof. In some examples, the stiffener 254 can have a higher stiffness than the material including the housing 239 in at least one bend direction or axis. In some examples, the stiffener 254 can include metal in the form of a metallic sheet. Further details regarding the connector straps of a modular wearable electronic device, including details regarding the operational components thereof are provided with respect to FIGS. 3 and 4.

Figures 3, 4:
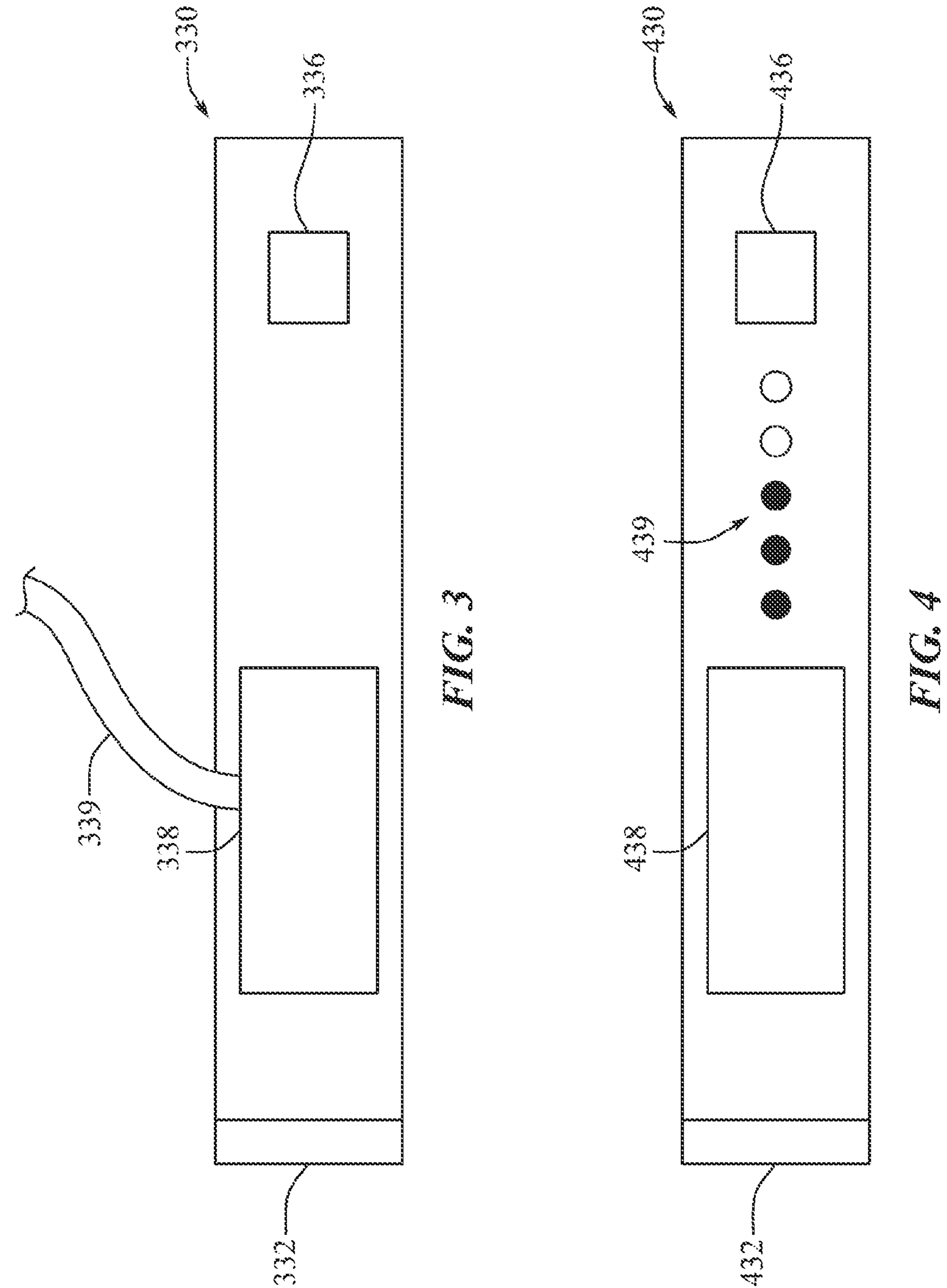
FIG. 3 shows a side view of a component of a wearable electronic device.
FIG. 4 shows a side view of a component of a wearable electronic device.

FIG. 3 shows a side view of a component 330 that can be used as part of a module wearable electronic device as described herein. In some examples, the component 330 can be a connector strap 330 and can be substantially similar to, or can include some or all of the features of the other connector straps and/or electronic device described herein. The example shown in FIG. 3 can be substantially similar to the connector strap 230 shown in FIG. 2C, and can include an HMD connector 332, a supplemental unit connector 336, and a retention band connector (not shown) disposed on an opposite side of the supplemental unit connector 336.

In the example shown in FIG. 3, the operational component 338 of the strap 330 can include a data output component. That is, the operational component 338 can be configured to transmit data from the strap 330 and/or any of the components of a wearable device in communication with the strap, such as an HMD and/or supplemental unit, to another electronic device. In some examples, the output device 338 can output data at a relatively high bitrate. In some examples, the output component 338 can have a direct electrical connection to a secondary device through a conductor or cable 339 as shown. In some examples, however, the output component 338 can include one or more antennas to wireless transmit data to a secondary device as desired.

In some examples, a user can include the strap 330 including the output component 338 in a module electronic device in place of, for example the strap 230 shown in FIGS. 2A, 2C, and 2D in situations where high throughput transfer of data from the wearable device to a secondary device is desired. In other scenarios where this functionality may not be needed or desired, however, the strap 230 can be included in the wearable device instead.

FIG. 4 shows a side view of a component 430 that can be used as part of a module wearable electronic device, as described herein. In some examples, the component 430 can be a connector strap 430 and can be substantially similar to, or can include some or all of the features of the other connector straps and/or electronic device described herein. The example shown in FIG. 4 can be substantially similar to the connector strap 230 shown in FIG. 2C, and can include an HMD connector 432, a supplemental unit connector 436, and a retention band connector (not shown) disposed on an opposite side of the supplemental unit connector 436.

The strap 430 can also include an operational component 439 including a visual or display component. In the example shown in FIG. 4, the operational component 439 can take the form of one or more LEDs that can be selectively illuminated in order to visually display information. In some examples, the operational component 439 can include any other type of display or display technology, or combinations thereof. In some examples, the display 439 can be used to present visual information to persons other than the user when the wearable electronic device of which the strap 430 is part. In some examples, the display 439 can be configured to present visual information to a user when the wearable device is not being worn. For example, the display 439 can communicate a batter level of the device before a user puts the device on. Further, as shown, the strap 430 can include a second additional operational component 438 in addition to the display 439.

Any number or variety of components in any of the configurations described herein can be included in a wearable electronic device, such as the HMD devices and/or HMD systems described herein. The components can include any combination of the features described herein, and can be arranged in any of the various configurations described herein. The structure and arrangement of components of a device, as well as the concepts regarding their use can apply not only to the specific examples discussed herein, but to any number of embodiments in any combination. Various examples of electronic devices and electronic device components including some having various features in various arrangements are described below, with reference to FIGS. 5A-10C.

Figures 5A, 5B, 5C:
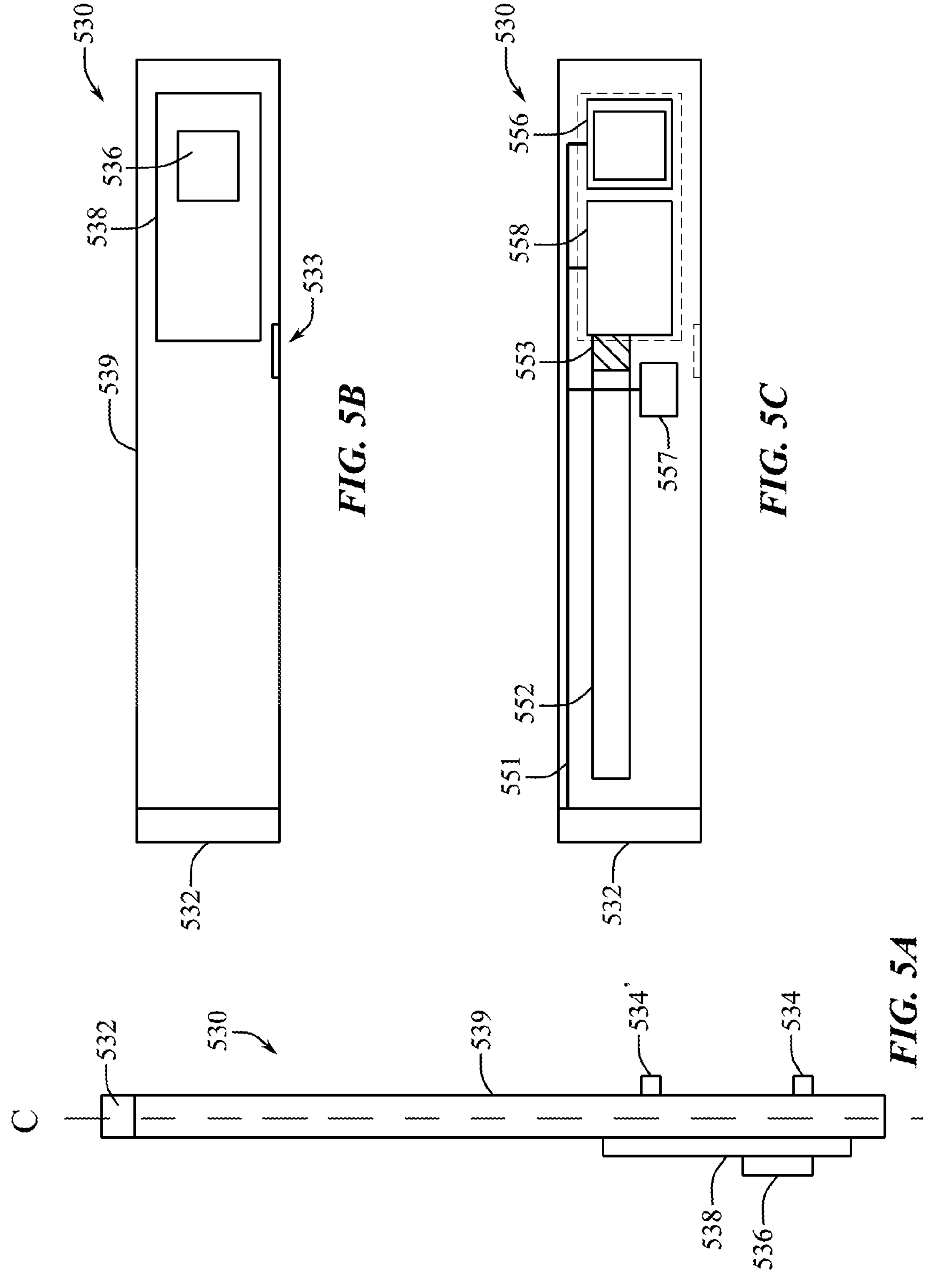
FIG. 5A shows a top view of a component of a wearable electronic device.
FIG. 5B shows a side view of the component of FIG. 5A.
FIG. 5C shows a cross-sectional view of the component of FIG. 5A.

FIG. 5A shows a top view of a component 530 that can be part of, or can be used with, a wearable electronic device, as described herein. In some examples, the component 530 can be a connector strap 530 and can be substantially similar to, or can include some or all of the features of the other connector straps and/or electronic device described herein. As with other connector straps described herein, the connector strap 530 can include a first connector 532 that can be an HMD connector 532, a second connector 536 that can be a supplemental unit connector, and a third connector 534 that can be a retention band connector. As described herein, in some examples, the retention band connector 534 can include multiple connection portions. In the example shown in FIG. 5A, the retention band connector 534 can include a first connection portion and a second connection portion 534' spaced apart from the first connection portion on the same side of the connector strap 530.

The connector strap 530 can have a housing 539 that can at least partially define an internal volume and an offset surface that is proud of a major surface of the housing 539. That is, the housing can define a protrusion or protruding portion 538 and one or more operational components can be positioned in or at this protrusion 538. Additionally, in some examples, one or more connectors of the connector strap 530 can also be positioned at or in this protrusion 538. For example, the supplemental unit connector 536 can be positioned at least partially at an external surface of the housing 539 defined by the protrusion 538. In some examples, the external surface of the housing can include the outer surface of the housing. In some additional examples, the external surface can further include an outer surface of the housing that is oriented away from a user's head when worn by the user.

FIG. 5B shows a side view of the connector strap 530. In addition to defining an internal volume and external surface of the connector strap 530, the housing 539 of the connector strap 530 can define one or more openings or ports 533. In some examples, the housing 539 can define one or more audio ports 533 that are acoustically connected to an audio module or speaker and can allow an audio module or a speaker positioned in the internal volume defined by the housing 539 to communicate with the ambient environment. In some examples, the housing 539 can define two opposing major surfaces and the audio port 533 can be position at an edge or a minor surface joining the two opposing surfaces. Additionally, while one of the major surfaces, such as the major surface shown in FIG. 5B can be interrupted by a protrusion 538, at least one of the major surfaces (not shown) can extend an entire length of the connector strap 530 and/or an entire length of the internal volume of the strap 530.

FIG. 5C shows a cross-sectional view of the connector strap 530 in the position shown in FIG. 5B, but with a major surface of the housing 539 not shown in order to illustrate the positioning of components in the internal volume. In the present example, the strap 530 can include two or more operational components 557, 558, at least one or which can be positioned at the protrusion 538. In some examples, a first operational component 557 can include a first audio module disposed in the internal volume and can be configured to output a first range of audio frequencies, while a second operational component 558 can include a second audio module disposed in the internal volume and configured to output a second range of audio frequencies different than the first range. Additionally drivers of the first and/or second audio modules 557, 558 can be in communication with the audio port 533 in order to output sound therefrom. In some examples, one or more of the audio modules 557, 558 can have open-box or ported speaker construction or closed-box or sealed speaker construction. In some examples, one audio module 557 can function as a tweeter, while the second audio module 558 can function as a woofer.

As with other straps 530 described herein, the strap 530 can include a stiffener 552 that is flexible in a first direction, and rigid in at least one direction that is perpendicular to the first direction. One or more of the operational components 557, 558 and/or connectors 536 can be positioned on, or can be connected to a printed circuit board 556 positioned in the internal volume. The printed circuit board 556 can also include components or electronic elements, including memory and processors positioned thereon. In some examples, the strap 530 can also include a rigid support member 553 positioned between the printed circuit board 556 and the stiffener 552, the rigid support member 553 being more rigid than the stiffener in the first direction.

In this particular example, a transmission array or transmission component(s) 551 can be disposed in the internal volume to electrically connect the HMD connector 532 to the printed circuit board 556, the supplemental unit connector 536 and/or one or more operational components 557, 558. In some examples, the transmission component 551 can extend along a center-line of the housing 539. In some examples including multiple conductors or transmission components, a first conductor can be positioned or disposed adjacent to one internal surface of the housing of the strap 530, and a second conductor can be positioned or disposed adjacent to another different internal surface of the housing of the strap. In some examples, different conductors may be positioned on opposite sides of internal components, such as the printed circuit board 556, operational components 557, 558, stiffeners, and the like. In some examples, the components of the strap 530 can be maintained in their desired locations by internal fixtures and/or attachment features defined by, or attached to the housing 539. In some examples, such as where the housing 539 includes a relatively flexible material, such as a polymeric material, the housing 539 be at least partially overmolded around at least some of the components of the strap 530, including the printed circuit board 556, operational components 557, 558, and/or connectors 532, 536. Further details of connector straps for wearable electronic devices are described with respect to FIGS. 6A-6C.

Figures 6A, 6B, 6C:
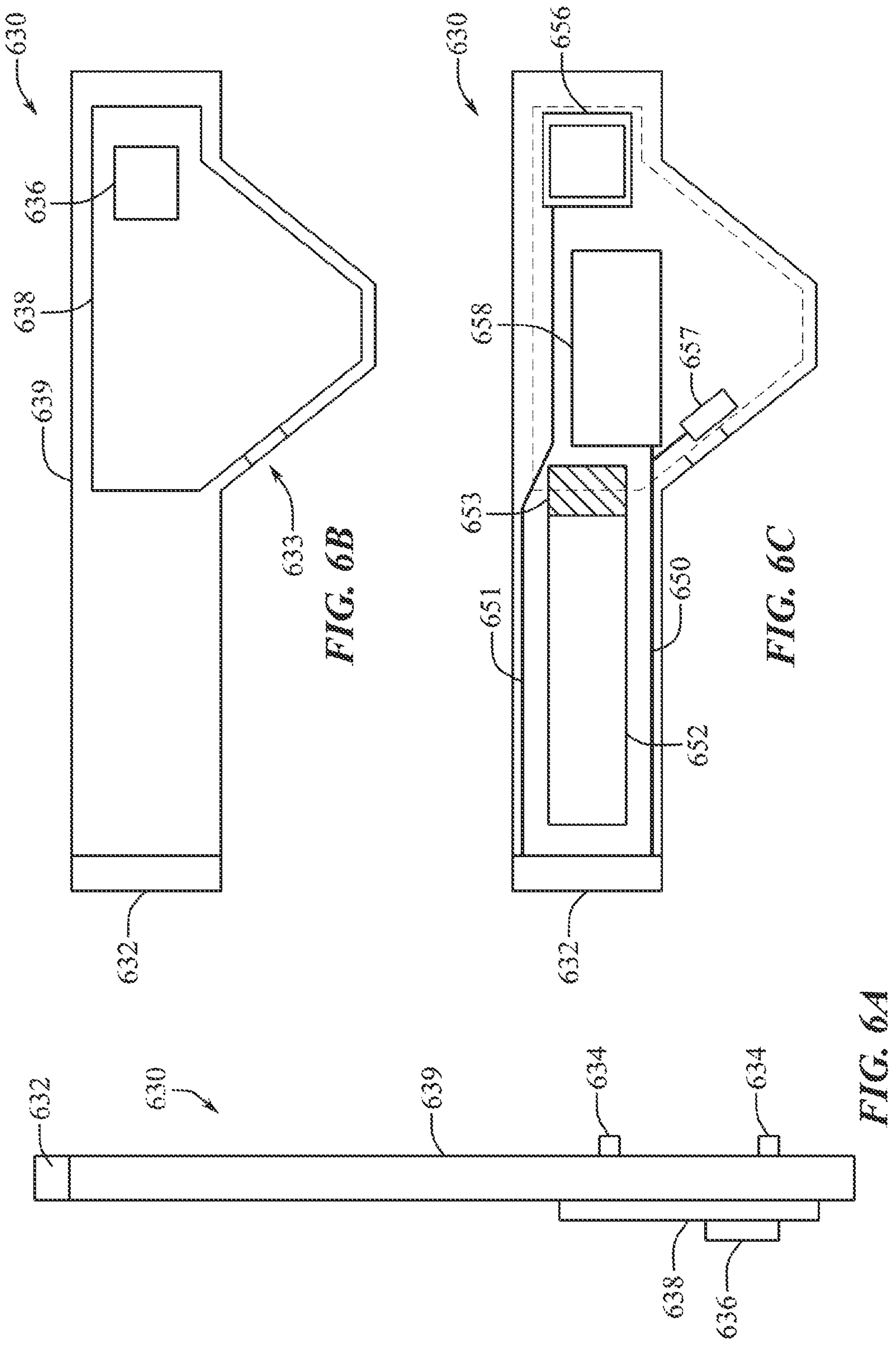
FIG. 6A shows a top view of a component of a wearable electronic device.
FIG. 6B shows a side view of the component of FIG. 6A.
FIG. 6C shows a cross-sectional view of the component of FIG. 6A.

FIG. 6A shows a top view of a component 630 that can be part of, or can be used with a wearable electronic device, as described herein. In some examples, the component 630 can be a connector strap 630 and can be substantially similar to, or can include some or all of the features of the other connector straps and/or electronic device described herein. As with other connector straps described herein, the connector strap 630 can include a first connector 632 that can be an HMD connector 632, a second connector 636 that can be a supplemental unit connector, and a third connector 634 that can be a retention band connector. As described herein, in some examples, the retention band connector 634 can include multiple connection portions. The connector strap 630 can have a housing 639 that can at least partially define an internal volume and an offset surface that is proud of a major surface of the housing 639. That is, the housing can define a protrusion or protruding portion 638 and one or more operational components can be positioned in or at this protrusion 638. The protruding portion 638 can be a portion of the housing that is wider that another portion, in any direction.

FIG. 6B shows a side view of the connector strap 630. In addition to defining an internal volume and external surface of the connector strap 630, the housing 639 of the connector strap 630 can define one or more openings or ports 633. In some examples, the housing 639 can define one or more audio ports 633 that can allow an audio module or speaker positioned in the internal volume defined by the housing 639 to communicate with the ambient environment. Additionally, as shown, the connector strap 630 may not have a constant height or thickness along its entire length. In some examples, a portion of the housing can be enlarged relative to other portions of the strap 630, such as to provide room for operational components, and/or to position operational components nearer to their desired location relative to a user.

FIG. 6C shows a cross-sectional view of the connector strap 630 in the position shown in FIG. 6B, but with a major surface of the housing 639 not shown in order to illustrate the positioning of components in the internal volume. In the present example, the strap 630 can include two or more operational components 657, 658, at least one or which can be positioned at the protrusion 638. In some examples, a first operational component 657 can include a first audio module disposed in the internal volume and configured to output a first range of audio frequencies, while a second operational component 658 can include a second audio module disposed in the internal volume and configured to output a second range of audio frequencies different than the first range. Additionally drivers of the first and/or second audio modules 657, 658 can be in communication with the audio port 633 in order to output sound therefrom. In some examples, one or more of the audio modules 657, 658 can have open-box speaker construction or closed-box speaker construction. In some examples, one audio module 657 may function as a tweeter, while the second audio module 658 can function as a woofer. In some examples, the strap 630 can include one or more sensors, for example a sensor that can detect a location of a user's ear relative to the strap and can aid in directing sound from the audio port 633 to the user's ear.

As with other straps 630 described herein, the strap 630 can include a stiffener 652 that is flexible in a first direction and rigid in at least one direction that is perpendicular to the first direction. One or more of the operational components 657, 658 and/or connectors 636 can be positioned on, or connected to, a printed circuit board 556 positioned in the internal volume. The printed circuit board 656 can also include components, including memory and processors positioned thereon. In some examples, the strap 630 can also include a support member 553 positioned between the printed circuit board 656 and the stiffener 652, the support member 653 being more rigid than the stiffener in the first direction.

In this particular example, a transmission array or transmission component(s) 650, 651 can be disposed in the internal volume to electrically connect the HMD connector 632 to the printed circuit board 656, the supplemental unit connector 636 and/or one or more operational components 657, 658. In some examples, the transmission components 650 651 can extend along a center-line "C" of the housing 639. In some examples, the components of the strap 630 can be maintained in their desired locations by internal fixtures and/or attachment features defined by, or attached to the housing 639. In some examples, such as where the housing 639 includes a relatively flexible material, such as a polymeric material, the housing 639 be at least partially overmolded around at least some of the components of the strap 630, including the printed circuit board 656, operational components 657, 658, and/or connectors 632, 636.

In some examples, the housing 539 can include a first portion, such as the portion containing the stiffener 652, and a second portion, such as the portion containing the first audio module 657 and the second audio module 658. In some examples, this second portion can have a greater height than the first portion, as shown. Additionally, because this second portion can also be where the protrusion 638 is located, the second portion can also have a thickness or width that is greater than a thickness or width of the first portion. Further details of connector straps for wearable electronic devices are described with respect to FIGS. 7A-7C.

Figures 7A, 7B, 7C:
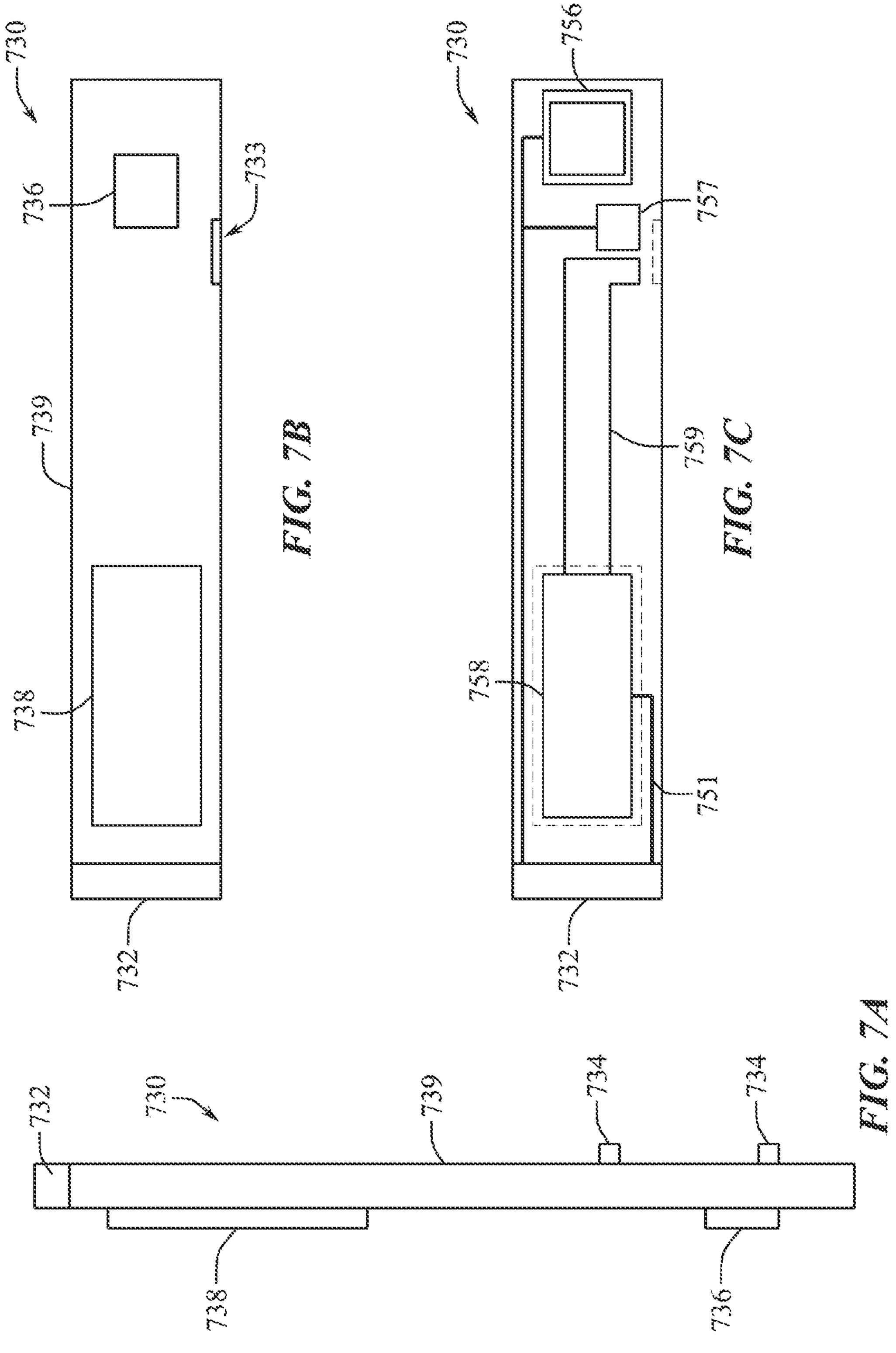
FIG. 7A shows a top view of a component of a wearable electronic device.
FIG. 7B shows a side view of the component of FIG. 7A.
FIG. 7C shows a cross-sectional view of the component of FIG. 7A.

FIG. 7A shows a top view of a component 730 that can be part of, or used with a wearable electronic device, as described herein. In some examples, the component 730 can be a connector strap 730 and can be substantially similar to, or can include some or all of the features of the other connector straps and/or electronic device described herein. As with other connector straps described herein, the connector strap 730 can include a first connector 732 that can be an HMD connector 732, a second connector 736 that can be a supplemental unit connector, and a third connector 734 that can be a retention band connector. As described herein, in some examples, the retention band connector 734 can include multiple connection portions. The connector strap 730 can have a housing 739 that can at least partially define an internal volume and an offset surface that is proud of a major surface of the housing 739. That is, the housing can define a protrusion or protruding portion 738 and one or more operational components can be positioned in or at this protrusion 738.

FIG. 7B shows a side view of the strap 730. As can be seen in FIGS. 7A and 7B, in some examples, the protrusion 738 defined by the housing 739 of the strap 730 can be positioned at any desired location on the strap 730. Additionally, the protrusion 738 can be spaced apart from an audio port 733 defined by the housing 739. Further, as can be seen in FIG. 7C, this means that an operational component, such as an audio module 758 can be positioned in the internal volume of the strap 730 away from the audio port 733. It can still be desirable, however, for the audio module 758 and/or a driver thereof to be in communication with the audio port 733 (shown with dashed lines). In order to facilitate this communication, the strap 730 can include an acoustic guide 759 that can include one or more channels in communication with the audio module 758 and the audio port 733. In this way, the audio module 758 can be positioned away from the audio port 733, but can still direct sound to a user from the audio port 733. In some examples, the acoustic guide 759 can include any material desired, including metals or polymers. In some examples, the acoustic guide 759 can be flexible and can bend or flex with the strap 730 while still providing acoustic communication. In some examples, the acoustic guide 759 may not be a separate or discrete component and may be at least partially defined by the housing 739 itself.

The strap 730 can also include some or all of the other components and features of the other straps described herein. For example, while the audio module 758 can be positioned away from the audio port 733 and communicate with the audio port 733 through an acoustic guide 759, the strap 730 can include another audio module 757 that can be positioned near to the audio port 733 to communicate therewith. The strap can also include a printed circuit board that can be connected through various transmission components 751 to other connectors 732 and/or components 757, 758 of the strap 730. Further details of connector straps for wearable electronic devices are described with respect to FIGS. 8A-8C.

Figures 8A, 8B, 8C:
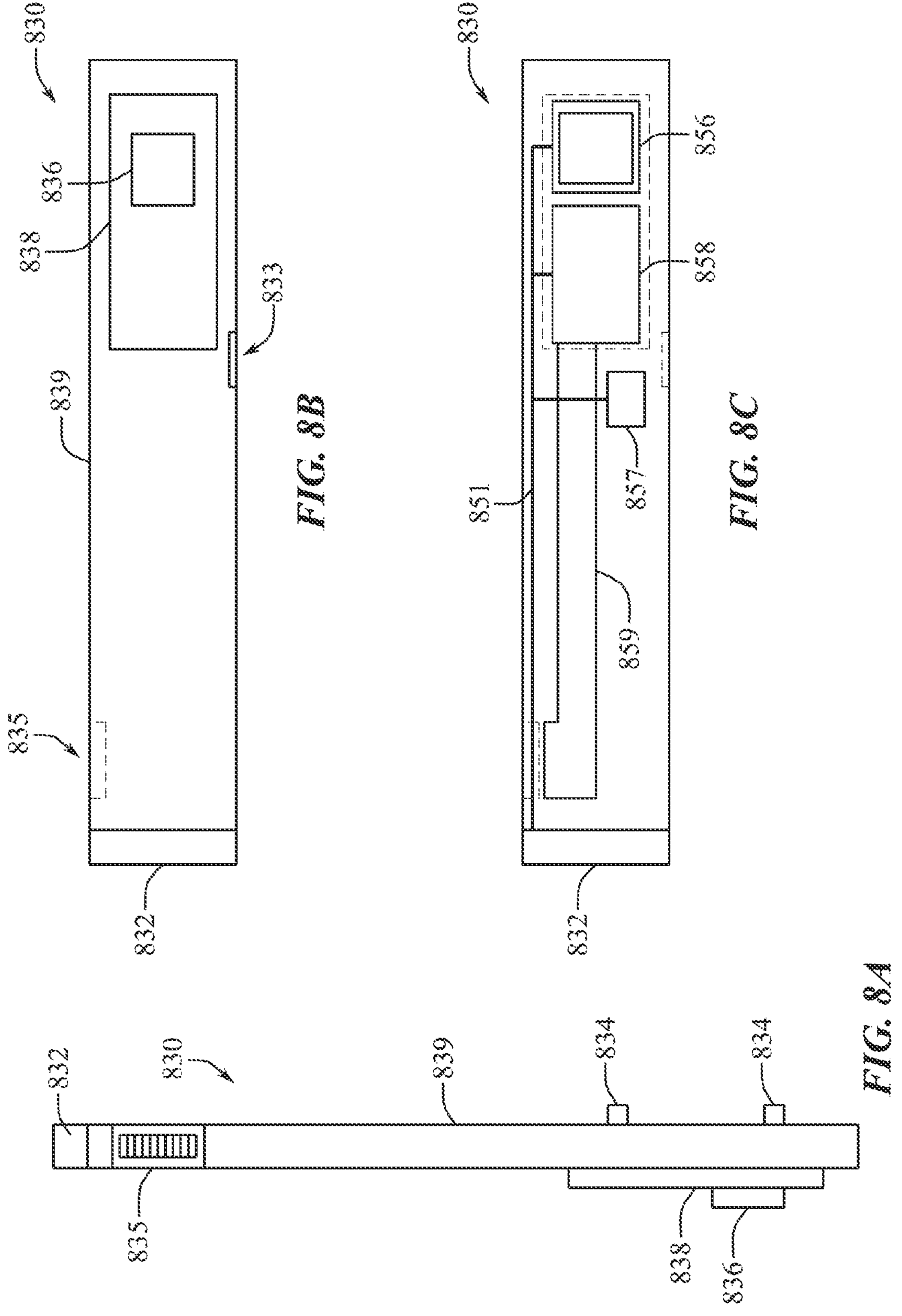
FIG. 8A shows a top view of a component of a wearable electronic device.
FIG. 8B shows a side view of the component of FIG. 8A.
FIG. 8C shows a cross-sectional view of the component of FIG. 8A.

FIG. 8A shows a top view of a component 830 that can be part of, or can be used with a wearable electronic device, as described herein. In some examples, the component 830 can be a connector strap 830 and can be substantially similar to, or can include some or all of the features of the other connector straps and/or electronic device described herein. As with other connector straps described herein, the connector strap 830 can include a first connector 832 that can be an HMD connector 832, a second connector 836 that can be a supplemental unit connector, and a third connector 834 that can be a retention band connector. As described herein, in some examples, the retention band connector 834 can include multiple connection portions. The connector strap 830 can have a housing 839 that can at least partially define an internal volume and an offset surface that is proud of a major surface of the housing 839. That is, the housing can define a protrusion or protruding portion 838 and one or more operational components can be positioned in or at this protrusion 838.

As seen in the side view of FIG. 8B, the strap 830 can have a similar configuration as other straps described herein, such as straps 530, 630, where the protrusion 838 is positioned at an end of the strap that includes the supplemental unit connector 836. In addition to the audio port 833, the housing 839 can further define a vent, an exit, or a back port 835 that can be positioned at an opposite side of the strap from the audio port 833. In some examples, the back port 835 can also be positioned at an opposite end of the strap 830 from the audio port 833. In some examples, it can be desirable to position the back port 835 at a location on the strap 830 that is as far away from the audio port as possible or feasible.

FIG. 8C shows a cross-sectional view of the strap 830, including first and second audio modules 857, 857, printed circuit board 856, and transmission component 851 including a conductor such as cables or wires. In the present example, the strap 830 also includes an acoustic guide 859 that can be in communication with the audio module 858 or a driver thereof. Whereas the acoustic guide 759 shown in FIG. 7C is configured to direct sound generated by the audio module 758 to the audio port 733, the acoustic guide 859 can be configured to direct the back wave generated by the driver of the audio module 758 to the back port, and thus, away from the user's ear. Accordingly, the audio module 758 can include an open-box or open-back speaker and the acoustic guide 859 can be in communication with the back or rear surface of the speaker's diaphragm so as to release backpressure and/or direct negative sound waves generated by the speaker away from the user's ear. This construction can thus allow for the audio modules 857, 858 to generate high quality audio in a relatively small package. Further details of connector straps for wearable electronic devices are described with respect to FIGS. 9A-9C.

Figures 9A, 9B, 9C:
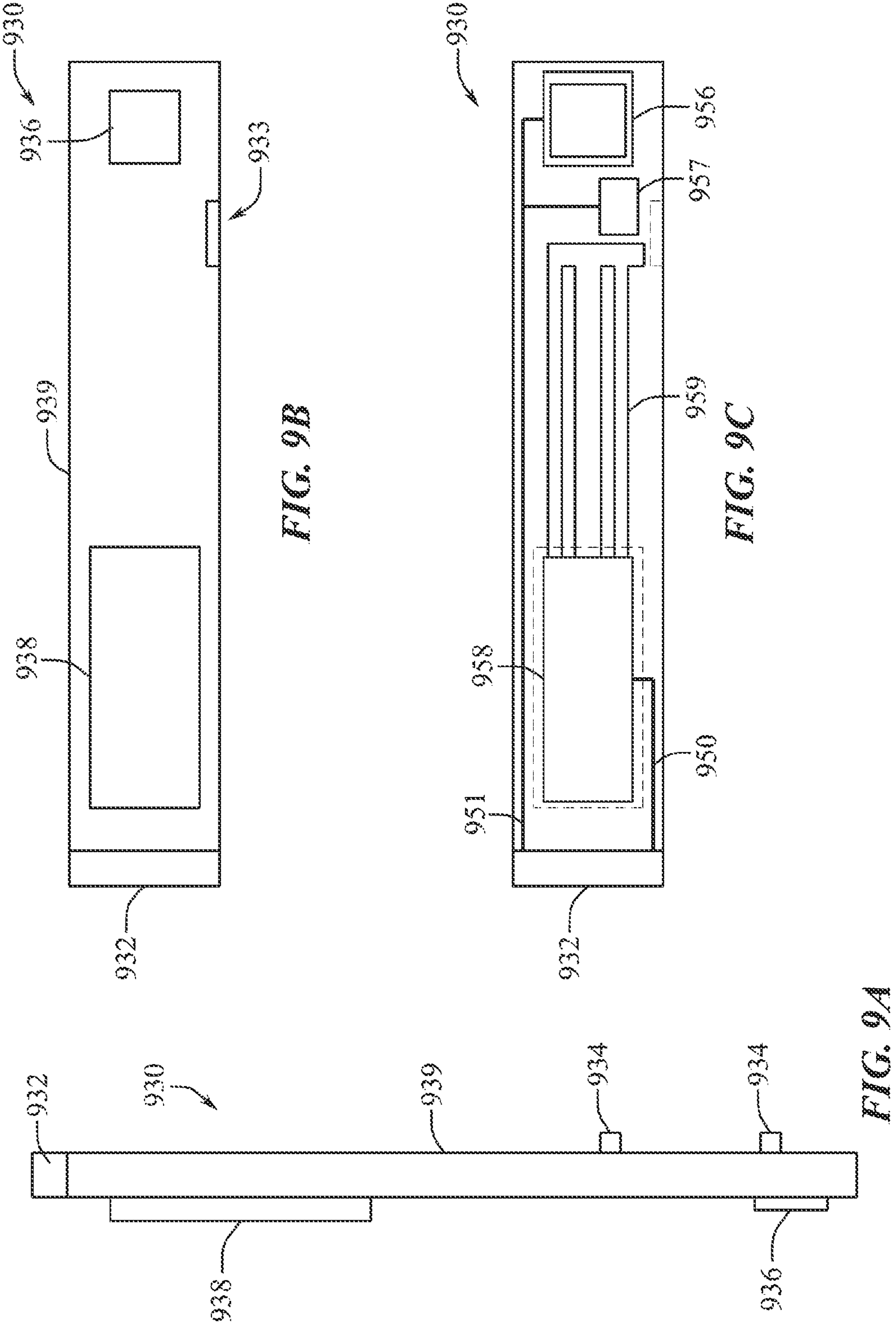
FIG. 9A shows a top view of a component of a wearable electronic device.
FIG. 9B shows a side view of the component of FIG. 9A.
FIG. 9C shows a cross-sectional view of the component of FIG. 9A.

FIG. 9A shows a top view of a component 930 that can be part of, or used with a wearable electronic device, as described herein. In some examples, the component 930 can be a connector strap 930 and can be substantially similar to, or can include some or all of the features of the other connector straps and/or electronic device described herein. As with other connector straps described herein, the connector strap 930 can include a first connector 932 that can be an HMD connector 932, a second connector 936 that can be a supplemental unit connector, and a third connector 934 that can be a retention band connector. As described herein, in some examples, the retention band connector 934 can include multiple connection portions. The connector strap 930 can have a housing 939 that can at least partially define an internal volume and an offset surface that is proud of a major surface of the housing 939. That is, the housing can define a protrusion or protruding portion 938 and one or more operational components can be positioned in or at this protrusion 938.

FIG. 9B shows a side view of the strap 930. As can be seen in FIGS. 9A and 9B, in some examples, the protrusion 938 defined by the housing 939 of the strap 930 can be positioned at any desired location on the strap 930. Additionally, the protrusion 938 can be spaced apart from an audio port 933 defined by the housing 939. Further, as can be seen in FIG. 9C, this means that an operational component, such as an audio module 958 can be positioned in the internal volume of the strap 930 away from the audio port 933. In some examples, the strap 930 can include an acoustic guide 959 that can include one or more channels in communication with the audio module 958 and the audio port 933. In some examples, the acoustic guide 959 can define two or more, three or more, four or more, or even more channels. In some examples, the acoustic guide 959 can define three channels. In some examples, the acoustic guide 959 can also function as a stiffener for the strap 930. That is, the acoustic guide 959 can be flexible along a first bend direction, and rigid along a second, different bend direction. In some examples, the acoustic guide 959 can thus be considered a flexible acoustic guide, or a semi-rigid acoustic guide.

The strap 930 can also include some or all of the other components and features of the other straps described herein. For example, while the audio module 958 can be positioned away from the audio port 933 and communicate with the audio port 933 through an acoustic guide 959, the strap 930 can include another audio module 957 that can be positioned near to the audio port 933 to communicate therewith. The strap can also include a printed circuit board that can be connected through various transmission components 951 to other connectors 932 and/or components 957, 958 of the strap 930. Further details of connector straps for wearable electronic devices are described with respect to FIGS. 10A-10C.

Figures 10A, 10B, 10C:
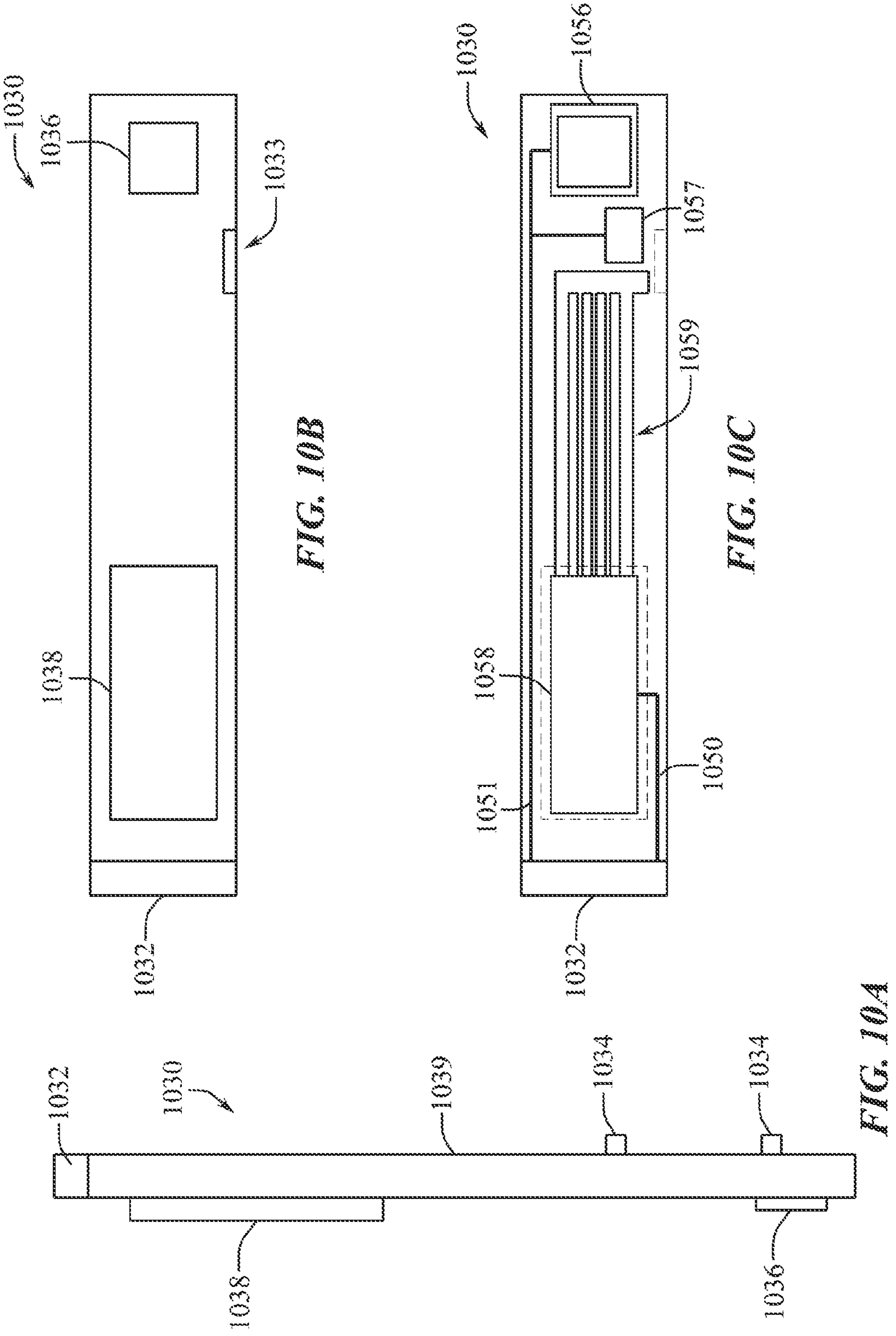
FIG. 10A shows a top view of a component of a wearable electronic device.
FIG. 10B shows a side view of the component of FIG. 10A.
FIG. 10C shows a cross-sectional view of the component of FIG. 10A.

FIG. 10A shows a top view of a component 1030 that can be part of, or can be used with, a wearable electronic device, as described herein. In some examples, the component 1030 can be a connector strap 1030 and can be substantially similar to, or can include some or all of the features of the other connector straps and/or electronic device described herein. As with other connector straps described herein, the connector strap 1030 can include a first connector 1032 that can be an HMD connector 1032, a second connector 1036 that can be a supplemental unit connector, and a third connector 1034 that can be a retention band connector. As described herein, in some examples, the retention band connector 1034 can include multiple connection portions. The connector strap 1030 can have a housing 1039 that can at least partially define an internal volume and an offset surface that is proud of a major surface of the housing 1039. That is, the housing can define a protrusion or protruding portion 1038 and one or more operational components can be positioned in or at this protrusion 1038.

FIG. 10B shows a side view of the strap 1030. As can be seen in FIGS. 10A and 10B, in some examples, the protrusion 1038 defined by the housing 1039 of the strap 1030 can be positioned at any desired location on the strap 1030. Additionally, the protrusion 1038 can be spaced apart from an audio port 1033 defined by the housing 1039. Further, as can be seen in FIG. 10C, this means that an operational component, such as an audio module 1058 can be positioned in the internal volume of the strap 1030 away from the audio port 1033. In some examples, the strap 1030 can include an acoustic guide 1059 that can include one or more channels in communication with the audio module 1058 and the audio port 1033. In some examples, the acoustic guide 1059 can include multiple channels. In some examples, the multiple channels of the acoustic guide 1059 can have a same size and cross-sectional area, or different sizes and/or cross-sectional areas. In some examples, one or more of the channels defined by the acoustic guide 1059 can have a rectangular cross-sectional shape, a round or circular cross-sectional shape, or any cross-sectional shape or shapes as desired. In some examples, the number of channels and their cross-sectional area can allow for the acoustic guide 1059 to be relatively flexible in at least one direction, while being relatively resistance to compression or collapse along other directions.

The strap 1030 can also include some or all of the other components and features of the other straps described herein. For example, while the audio module 1058 can be positioned away from the audio port 1033 and communicate with the audio port 1033 through an acoustic guide 1059, the strap 1030 can include another audio module 1057 that can be positioned near to the audio port 1033 to communicate therewith. The strap can also include a printed circuit board that can be connected through various transmission components 1051 to other connectors 1032 and/or components 1057, 1058 of the strap 1030.

Any number or variety of components in any of the configurations described herein can be included in a wearable electronic device, such as the HMD devices and/or HMD systems described herein. The components can include any combination of the features described herein, and can be arranged in any of the various configurations described herein. The structure and arrangement of components of a device, as well as the concepts regarding their use can apply not only to the specific examples discussed herein, but to any number of embodiments in any combination. Various examples of electronic devices and electronic device components including some having various features in various arrangements are described below, with reference to FIGS. 11-13.

Figure 11:
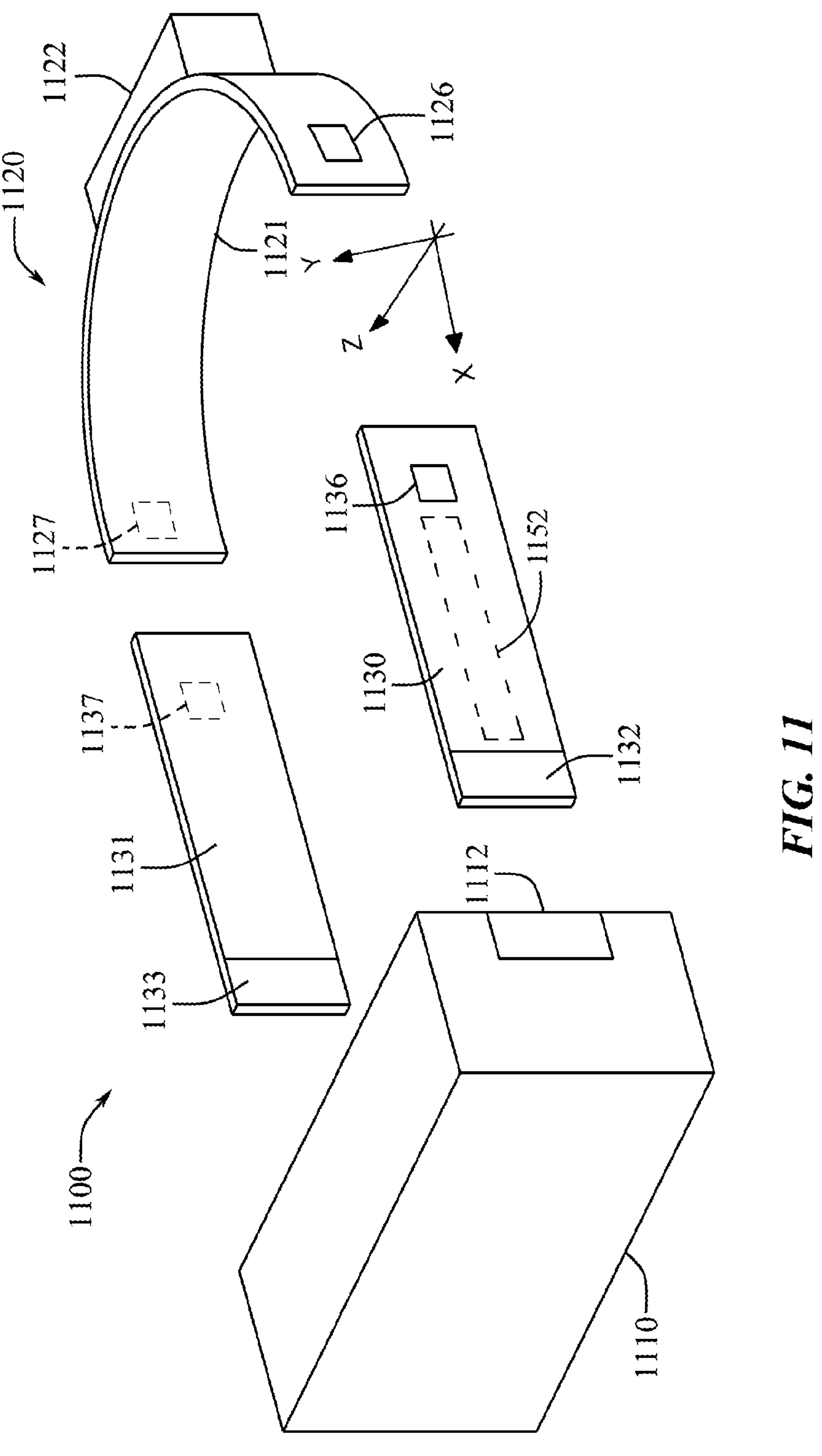
FIG. 11 shows an exploded view of a wearable electronic device.

FIG. 11 shows an exploded view of a wearable electronic device 1100 that can include modular components which can be selectively and removably or releasably attached or coupled to one another as described herein. In some examples, the device 1100 can be substantially similar to, or can include some or all of the features of the other wearable electronic devices described herein. As with the electronic device 200, the device 1100 can include an HMD 1110, a retention band 1120, and one or more connector straps 1130, 1131.

The connector straps 1130, 1131 can include a number of connectors, such as HMD connectors 1132, 1133 that can releasably couple to corresponding connectors on the HMD, such as connector 1112. While the straps 230, 231 of FIG. 2A included separate retention band connectors and supplemental unit connectors, the device 1100 can include a retention band 1120 that includes an integrated supplemental unit 1122. Accordingly, the straps 1130, 1131 can include a combined retention band and supplemental unit connector 1136, 1137 that can both mechanically couple the straps 1130, 1131 to the retention band 1120 and electrically communicate data and/or power with the supplemental unit 1122 of the retention band 1120. The retention band 1120 itself can include corresponding connectors 1126, 1127 that can be releasably coupled to the retention band connectors 1136, 1137.

Additionally, as noted above, the connector straps 1130, 1131 can include a stiffener 1152 disposed in the flexible housing, the stiffener 1152 can be flexible along a first bend direction, such as a direction extending into and out of the page of FIG. 11, represented as the "Z" direction. Additionally, the stiffener 1152 can be rigid in one or more other bend directions, such as one or more directions parallel to the plane of the page of FIG. 11, represented as the "X" and "Y" directions, which are each substantially perpendicular to the "Z" direction. Stiffness in the "X" and "Y" directions allow the connector straps 1130, 1131 to support both the HMD 1110 and the retention band 1120 during operation, counteracting the moment or rotational force caused by the HMD 1110 and the retention band 1120. In this manner, the connector straps 1130, 1131 provide sufficient structural rigidity to maintain the relative position of each component in the system during use. Simultaneously, the flexibility provided in the "Z" direction provides a snug and comfortable fit to the side of a user's head during use, and can continue and enhance the secured fit provided by the retention band 1120. In some examples, the stiffener 1152 can include a polymer material, a metallic material, and/or combinations thereof. In some examples, the stiffener 1152 can have a higher stiffness than the material forming a majority of the connector straps 1130, 1131 in at least one bend direction or axis. In some examples, the stiffener 1152 can include metal in the form of a metallic sheet.

According to one example, the shape and material of the connector straps 1130, 1131 provide the desired combination of flexibility in the "Z" direction and rigidity in the "X" and "Y" directions even without the stiffener 1152. According to this example, the approximately rectangular cross-sectional profile of the connector straps 1130, 1131 having a height that is approximately between 5 and 10, between 10 and 20, between 20 and 50, or between 50 and 100 times that of the width facilitates bending or low-force buckling of the connector strap in the "Z" direction, while resisting buckling in the "X" and "Y" directions. In other words, buckling the connector straps 1130, 1131 in the "X" and "Y" directions can require 10, 20, 30, 50, or more times the force that is needed to buckle the connector straps in the "Z" direction. Additional modifications, such as profile curves or directional stiffeners, can be added to the connector straps 1130, 1131 to further strengthen the connector straps in desired directions.

In some examples, the retention band 1120 can include other operational or functional components in addition, or in alternative, to the supplemental unit 1122. For example, the component 1122 can include a battery module that can be in electrical communication with the straps 1130, 1131. Additionally, the device 1100 may include a separate processing unit (not shown), such as the supplemental unit 140 shown in FIG. 1C that can be connected to the strap 1130, while the retention band 1120 includes a second additional processing unit 1122. Further details regarding various configurations of wearable electronic devices are discussed with respect to FIG. 12.

Figure 12:
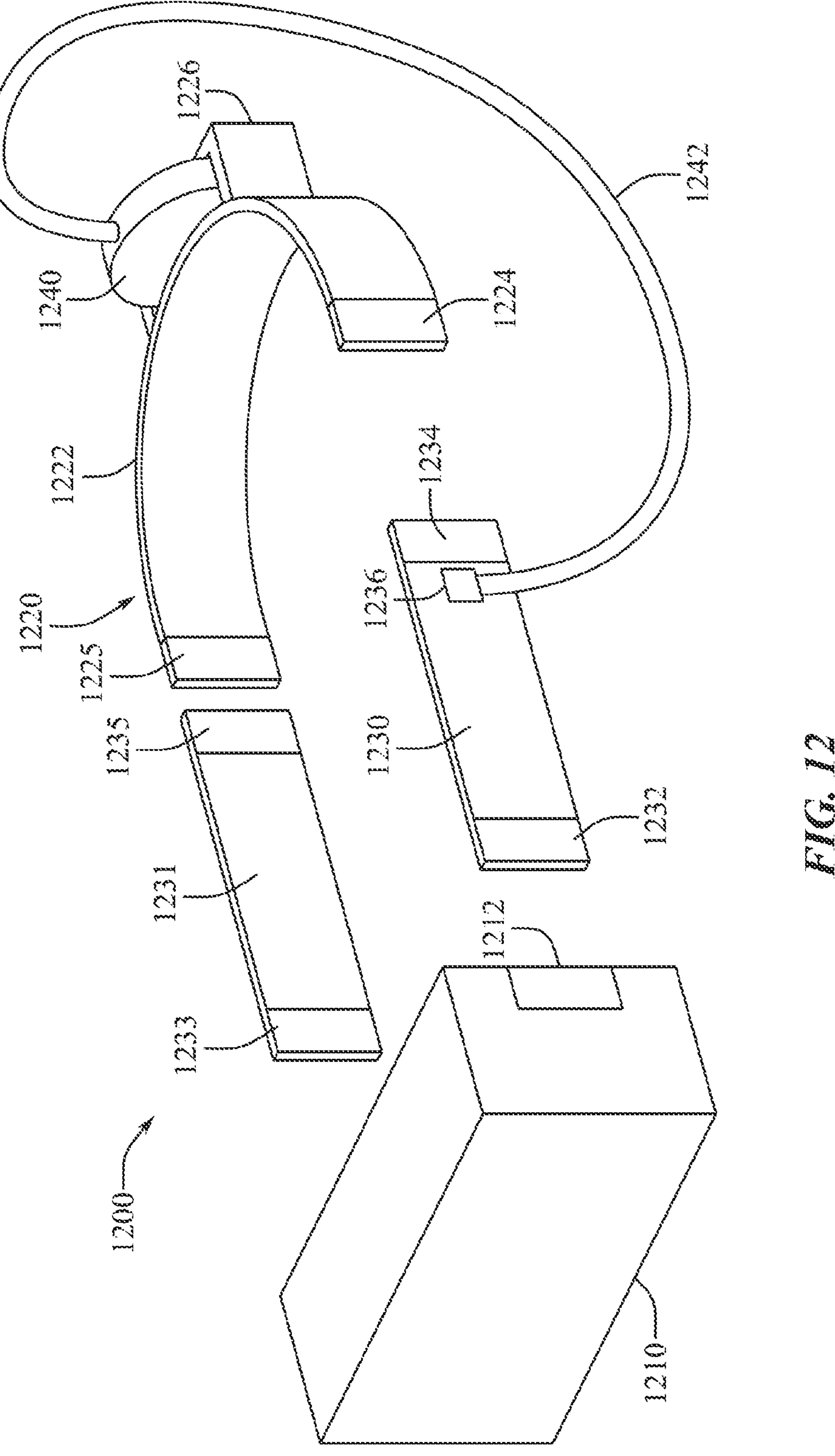
FIG. 12 shows an exploded view of a wearable electronic device.

FIG. 12 shows an exploded view of a wearable electronic device 1200 that can include modular components which can be selectively and removably or releasably attached or coupled to one another, as described herein. In some examples, the device 1200 can be substantially similar to, or can include some or all of the features of the other wearable electronic devices described herein. As with the electronic device 100, the device 1200 can include an HMD 1210, a retention band 1220, and one or more connector straps 1230, 1231, and a supplemental unit 1240.

The connector straps 1230, 1231 can include a number of connectors, such as HMD connectors 1232, 1233, that can releasably couple to corresponding connectors on the HMD, such as connector 1212. The connector straps 1230, 1231 can also include retention band connectors 1234, 1235 that can releasably couple to corresponding connectors 1224, 1225 on the retention band 1220. The connector strap 1230 can include a supplemental unit connector 1236 that can be releasably coupled to the supplemental unit 1240 through a conductor or cable 1242. In some examples, the retention band 1220 can include a band 1222 designed to secure the device 1200 to a user, and a pocket or compartment 1226 that can be attached to the band 1222 and which can be configured to hold or retain the supplemental unit 1240. In this way, the supplemental unit 1240 can be carried entirely on the device 1200 without the need to attach the supplemental unit 1240 to the user at another location.

Figure 13:
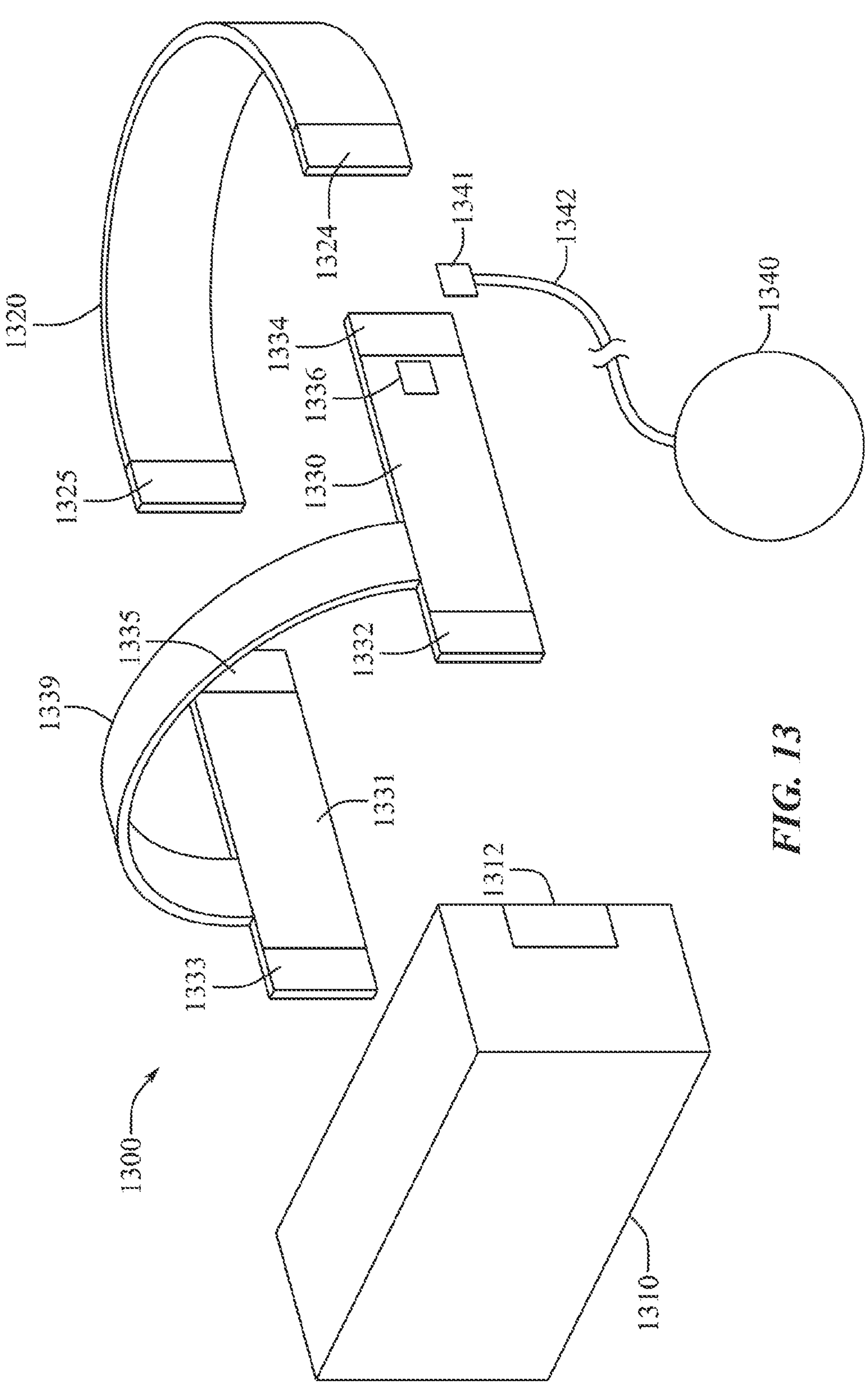
FIG. 13 exploded view of a wearable electronic device.

FIG. 13 shows an exploded view of a wearable electronic device 1300 that can include modular components which can be selectively and removably or releasably attached or coupled to one another as described herein. In some examples, the device 1300 can be substantially similar to, or can include some or all of the features of the other wearable electronic devices described herein. As with the electronic device 100, the device 1300 can include an HMD 1310, a retention band 1320, and one or more connector straps 1330, 1331.

The connector straps 1330, 1331 can include a number of connectors, such as HMD connectors 1332, 1333 that can releasably couple to corresponding connectors on the HMD, such as connector 1312. The connector straps 1330, 1331 can also include retention band connectors 1334, 1335 that can releasably couple to corresponding connectors 1324, 1325 on the retention band 1320. The connector strap 1330 can include a supplemental unit connector 1336 that can be releasably coupled to the supplemental unit 1340 through a conductor or cable 1342. Whereas some examples described herein can include two or more modular or separate connector straps, in some examples, the connector straps 1330, 1331 can be releasably or permanently joined to one another, such as by a third strap or a head strap 1339. In some examples, this head strap 1339 can extend over a user's head when the wearable electronic device 1300 is worn by a user. The head strap 1339 can thus provide a secured and comfortable fit to the user. Further, in examples where the strap 1339 is removably or releasably attached to the straps 1330, 1331, the user can opt whether or not to use the straps 1339 depending on the particular use scenario of the device 1300. In some examples, the strap 1339 can include any material as desired, including polymeric materials, fabric materials, and any of the materials described with respect to connector straps and/or retention bands.

Any of the features or aspects of the devices and components discussed herein can be combined or included in any varied combination. For example, the design and shape of the components or devices is not limited in any way and can be formed by any number of processes, including those discussed herein. As used herein, the terms exterior, outer, interior, and inner are used for reference purposes only. An exterior or outer portion of a component can form a portion of an exterior surface of the component, but may not necessarily form the entire exterior of outer surface thereof. Similarly, the interior or inner portion of a component can form or define an interior or inner portion of the component, but can also form or define a portion of an exterior or outer surface of the component.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "including."

Physical environment: A physical environment refers to a physical tangible world that people can sense and/or interact with without aid of electronic systems, using various senses. In contrast, computer-generated reality (CGR) environment is an environment that is wholly or partially simulated using an electronic system, and are often modified based on a user's detected physical motions. Examples of CGR include virtual reality and mixed reality. A virtual reality environment can be a simulated environment is designed to have sensory inputs that are entirely computer-generated, while a mixed reality (MR) environment is a simulated environment that incorporates inputs from the physical environment and includes computer-generated sensory inputs, such as an augmented reality or an augmented virtuality. An augmented reality environment is a simulated environment in which virtual objects are superimposed over a physical environment. An augmented virtuality environment refers to a simulated environment in which a virtual or computer generated environment incorporates one or more sensory inputs from the physical environment. These environments can be generated using any number of electronic systems including, but in no way limited to, head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers Personal information data, gathered pursuant to authorized and well established secure privacy policies and practices that are appropriate for the type of data collected, can be used to implement and improve on the various embodiments described herein. The disclosed concepts and technology is not, however, rendered inoperable in the absence of such personal information data.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

It will be understood that the details of the present systems and methods above can be combined in various combinations and with alternative components. The scope of the present systems and methods will be further understood by the following claims.

The following are example claims of the exemplary systems and methods described above:

1. An audio component for a wearable electronic device, comprising:
- a housing at least partially defining an internal volume and an audio port;
- a display connector to releasably and electrically connect to a display;
- a first audio module disposed in the internal volume and configured to output a first range of audio frequencies;
- a second audio module disposed in the internal volume and configured to output a second range of audio frequencies different than the first range; and
- a driver of the first audio module and a driver of the second audio module in communication with the audio port.

2. The audio component of claim 1, wherein:
- the housing defines a back port; and
- the driver of the first audio module is in communication with the back port.

3. The audio component of claim 1, wherein:
- the first audio module comprises a closed-box speaker; and
- the second audio module comprises a closed-box speaker.

4. The audio component of claim 1, wherein a thickness of a first portion of the housing containing the first audio module and the second audio module is greater than a thickness of a second portion of the housing.

5. The audio component of claim 1, wherein:
- the housing defines two opposing major surfaces; and
- the audio port is positioned at a minor surface joining the two opposing major surfaces.

6. The audio component of claim 5, wherein one of the major surfaces extends an entire length of the internal volume.

7. The audio component of claim 1, wherein the housing defines a major surface and an offset surface proud of the major surface; and
- further comprising a supplemental unit connector to releasably and electrically connect to a supplemental unit, the supplemental unit connector positioned at the offset surface.

8. A wearable electronic device, comprising:
- a head-mounted display (HMD);
- a supplemental unit;
- a strap, comprising:
  - an HMD connector to releasably and electrically connect the strap to the HMD;
  - a supplemental unit connector;
  - an audio module; and
  - a housing defining an audio port configured to direct sound to a user's ear; and
- a retention band including a strap connector.

9. The wearable electronic device of claim 8, wherein the strap is a first strap and the wearable electronic device comprises a second strap, the second strap comprising:
- an HMD connector to releasably connect the strap to the HMD; and
- an audio module.

10. The wearable electronic device of claim 8, wherein:
- the housing defines an internal volume having a first portion and a second portion that is wider than the first portion; and
- the audio module is disposed in the second portion.

11. The wearable electronic device of claim 8, wherein the audio module is at least one of a woofer or a tweeter.

12. The wearable electronic device of claim 8, wherein the strap comprises a sensor to detect a location of a user's ear.

13. An audio component for a wearable electronic device, comprising:
- a housing at least partially defining an internal volume and an audio port;
- a display connector disposed on a first end of the housing, the display connector electrically connected to the audio component and removably and electrically connectable to the HMD;
- a retention band connector disposed on a second end of the housing opposite the first end, the retention band connector removably connectable to a retention band; and
- an audio module disposed in the internal volume, the audio module comprising:
  - a driver; and
  - a flexible acoustic guide defining a channel in communication with the driver and the audio port.

14. The audio component of claim 13, wherein:
- the housing defines a back port spaced apart from the audio port; and
- the driver is in communication with the back port.

15. The audio component of claim 13, wherein the audio module is a close-box audio speaker.

16. The audio component of claim 13, wherein the flexible acoustic guide is flexible along a first bend direction and rigid along a second, different bend direction.

17. The audio component of claim 13, wherein the flexible acoustic guide defines multiple channels.

18. The audio component of claim 17, wherein the multiple channels have a round cross-sectional area.

19. The audio component of claim 13, wherein:
the audio module is a first audio module configured to output a first range of frequencies; and
the audio component further comprises a second audio module configured to output a second, different range of frequencies.

20. The audio component of claim 19, wherein the second audio module is in communication with and positioned adjacent to the audio port.

1. A component for a wearable electronic device, comprising:
a housing;
an HMD connector to provide electrical communication between the component and the HMD, the HMD connector positioned at a first end of the housing;
a supplemental unit connector to provide electrical communication between the component and the supplemental unit, the supplemental unit connector positioned at a second end of the housing opposite the first end; and
a conductor in electrical communication with the HMD connector and the supplemental unit connector, the conductor disposed in the housing.

2. The component of claim 1, further comprising a retention band connector to provide a mechanical connection to a retention band.

3. The component of claim 2, wherein the retention band connector is configured to provide electrical communication between the component and the retention band.

4. The component of claim 2, wherein the retention band connector is positioned on an opposite side of the housing from the supplemental unit connector.

5. The component of claim 1, wherein:
the HMD connector is positioned at an edge of the housing; and
the supplemental unit connector is positioned at a major surface of the housing.

6. The component of claim 1, wherein the conductor extends along a center-line of the housing.

7. The component of claim 1, wherein:
the conductor is a first conductor; and
the component further comprises a second conductor in electrical communication with the HMD connector and the supplemental unit connector.

8. The component of claim 7, wherein:
the first conductor is disposed adjacent to an internal surface of the housing; and
the second conductor is disposed adjacent to a second, different internal surface of the housing.

9. The component of claim 1, wherein the HMD connector defines at least a portion of two major surfaces of the component.

10. A wearable electronic device, comprising:
a head-mounted display (HMD);
a battery; and
a flexible strap removably connectable to the HMD and the battery, the removable strap comprising:
an HMD connector to exchange power and data with the HMD;
a battery connector to exchange power and data with the battery; and
an electrical conductor in electrical communication with the HMD connector and the battery connector.

11. The wearable electronic device of claim 10, wherein:
the flexible strap is a first flexible strap; and
the wearable electronic device comprises a second flexible strap.

12. The wearable electronic device of claim 11, wherein the second flexible strap receives power from the battery through an electrical connection to the HMD.

13. The wearable electronic device of claim 10, wherein the battery connector comprises a mechanical connector and an electrical connector.

14. The wearable electronic device of claim 10, wherein:
the battery comprises a strap connector configured to connect to the battery connector; and
the strap connector is configured to rotatably connect to the battery connector.

15. The wearable electronic device of claim 10, further comprising a retention band configured to electrically connect with the battery through the flexible strap.

16. A component for a wearable electronic device, comprising:
a flexible housing;
a first connector positioned on a first end of the component, the first connector removably and electrically attachable to the wearable electronic device;
a second connector positioned on a second end of the component, the second connector removably and electrically attachable to a battery; and
a transmission array disposed in the flexible housing and in electrical communication with the first connector and the second connector.

17. The component of claim 16, wherein the first connector comprises a printed circuit board disposed in the flexible housing.

18. The component of claim 17, further comprising a rigid support member positioned adjacent to the printed circuit board in the flexible housing.

19. The component of claim 16, wherein the first connector is configured to electrically and mechanically connect to the wearable electronic device.

20. The component of claim 19, wherein the battery is rotatably connected to the second connector.

What is claimed is:

1. A wearable electronic device, comprising:
a head-mounted display (HMD);
a supplemental unit;
a retention band; and
a strap, comprising:
a flexible housing defining a major plane, wherein:
the flexible housing has a first flexibility enabling a first deformation in and out of the major plane; and
the flexible housing has a second flexibility less than the first flexibility, the second flexibility configured to limit a second deformation in and out of a minor plane disposed perpendicular to the major plane;
an HMD connector to provide electrical communication between the strap and the HMD, the HMD connector positioned at a first end of the flexible housing;
a supplemental unit connector to provide electrical communication between the strap and the supplemental unit;
a retention band positioned at a second end of the flexible housing opposite the first end; and
a stiffener disposed within the flexible housing, the stiffener configured to further limit the second deformation and is in direct contact with an electronic internal component;

wherein:

the supplemental unit connector is positioned between the HMD connector and the retention band; and the supplemental unit is positioned external the strap.

2. The wearable electronic device of claim 1, wherein:

the strap is a first strap that comprises an operational component disposed in an internal volume defined by the flexible housing; and the wearable electronic device further comprises a second strap that is removably connectable to the HMD and the retention band.

3. The wearable electronic device of claim 2, wherein the first strap and the second strap are joined by a third strap.

4. The wearable electronic device of claim 1, further comprising a retention band connector positioned at an external surface on the second end of the flexible housing.

5. The wearable electronic device of claim 1, wherein:

the supplemental unit comprises a battery; and the retention band defines a pocket configured to retain the supplemental unit.

6. The wearable electronic device of claim 1, wherein the retention band comprises a battery in electrical communication with the strap.

7. The wearable electronic device of claim 1, wherein the supplemental unit comprises a processing unit.

8. The wearable electronic device of claim 1, wherein:

the supplemental unit is a first processing unit; and the retention band comprises a second processing unit in communication with the strap.

9. A component for a wearable electronic device, comprising:

a flexible housing defining an internal volume;

a stiffener disposed within the internal volume, the stiffener being flexible along a first axis and rigid along a second axis and a third axis, the second axis and the third axis being perpendicular to the first axis and to each other, wherein the stiffener is in direct contact with an electronic internal component;

a first connector removably and electrically attachable to a head-mounted display;

a second connector removably and electrically attachable to a supplemental unit; and an operational element disposed in the internal volume, the operational element electrically connected to at least one of the first connector or the second connector.

10. The component of claim 9, wherein the operational element comprises a speaker.

11. The component of claim 9, wherein the operational element comprises a touch sensor.

12. The component of claim 9, wherein the operational element comprises a data output component.

13. The component of claim 9, wherein the stiffener further comprises a polymer stiffener disposed in the internal volume, the polymer stiffener having a stiffness higher than a stiffness of the flexible housing.

14. The component of claim 9, wherein the stiffener further comprises a metal stiffener disposed in the internal volume.

15. The component of claim 9, further comprising a third connector removably attachable to a retention band.

16. The component of claim 15, wherein a connection between the component and the retention band is rotationally fixed.

17. A component for a wearable electronic device including a display, the component comprising:

a printed circuit board including electronic elements;

a retention band connector configured to provide a mechanical connection between the component and a retention band;

a display connector configured to provide data and power to the display; and a housing, the housing including a material overmolded around at least a portion of the printed circuit board; and a stiffener disposed within the housing and in direct contact with an electronic internal component, the stiffener being flexible in a first direction and rigid in a second direction perpendicular to the first direction.

18. The component of claim 17, further comprising a supplemental unit connector configured to receive power from a supplemental unit, the supplemental unit connector at least partially overmolded by the housing.

19. The component of claim 18 further comprising a rigid support member that is more rigid than the stiffener and positioned between the printed circuit board and the stiffener.

20. The component of claim 17, wherein the retention band connector comprises:

a first connection portion; and a second connection portion spaced apart from the first connection portion on a same side of the component.

21. A system configured to be used with the head of a user, comprising:

a head mounted display (HMD), the HMD including:

a flexible housing defining a flexure plane, the flexible housing configured to flex in and out of the flexure plane;

a stiffener disposed within the flexible housing and in direct contact with an electronic internal component;

a display attached to the flexible housing; and an electrical input attached to the flexible housing and electrically connected to the display;

a flexible band;

an intermediate member having a first end removably connectable to the HMD, the intermediate member extending from the HMD to the flexible band; and a supplemental unit removably connectable to a supplemental unit connector positioned between the first end and the flexible band.

22. The system of claim 21, further comprising an electrical connector on the intermediate member corresponding to the electrical input.

23. The system of claim 22, further comprising wires passing through the intermediate member to the electrical connector.

24. The system of claim 23, further comprising a battery input on the intermediate member opposite the electrical connector, the battery input connected to the wires.

25. The system of claim 23, wherein power is conveyed through the intermediate member to the HMD.

26. The system of claim 21, wherein:

the intermediate member is mechanically connected to the flexible band; and the intermediate member is mechanically and electrically connected to the HMD.

27. The system of claim 21, wherein the intermediate member comprises:

a body; and a processor positioned in body.

28. The system of claim 21, wherein the intermediate member comprises:

a body; and a speaker positioned in the body.

29. The system of claim 28, wherein the body defines a port acoustically connected to the speaker.

30. The system of claim 21, wherein:

the intermediate member comprises a first intermediate member; and the system further comprises a second intermediate member removably connectable to the HMD and the flexible band.

31. The system of claim 30, wherein when:

the first intermediate member is connected to the HMD and the flexible band;

the second intermediate member is connected to the HMD and the flexible band; and the system is worn by a user;

the first intermediate member and the second intermediate member each extend from a temple area of the user to an ear area of the user.

32. The system of claim 21, wherein the intermediate member includes a flexible band connector, an HMD connector, and a power connector.

* * * * *